(12) United States Patent
Martin

(10) Patent No.: US 10,923,783 B2
(45) Date of Patent: Feb. 16, 2021

(54) CONFORMAL FLUID-COOLED HEAT EXCHANGER FOR BATTERY

(71) Applicant: Dana Canada Corporation, Oakville (CA)

(72) Inventor: Michael A. Martin, Hamilton (CA)

(73) Assignee: DANA CANADA CORPORATION, Oakville (CA)

( * ) Notice: Subject to any disclaimer, the term of this patent is extended or adjusted under 35 U.S.C. 154(b) by 391 days.

(21) Appl. No.: 15/852,343

(22) Filed: Dec. 22, 2017

(65) Prior Publication Data

US 2018/0123190 A1  May 3, 2018

Related U.S. Application Data

(62) Division of application No. 13/261,622, filed as application No. PCT/CA2011/050624 on Oct. 3, 2011, now Pat. No. 9,893,392.
(Continued)

(51) Int. Cl.
| | |
|---|---|
| *H01M 10/61* | (2014.01) |
| *H01M 10/6567* | (2014.01) |
| *H01M 10/6555* | (2014.01) |
| *F28F 3/12* | (2006.01) |
| *H01M 2/00* | (2006.01) |
| *H01M 10/613* | (2014.01) |
| *F28D 1/03* | (2006.01) |

(Continued)

(52) U.S. Cl.
CPC ............ *H01M 10/61* (2015.04); *F28F 3/12* (2013.01); *H01M 2/00* (2013.01); *H01M 10/613* (2015.04); *H01M 10/6555* (2015.04); *H01M 10/6567* (2015.04); *F28D 1/0341* (2013.01); *F28D 2021/0043* (2013.01); *H01M 10/0525* (2013.01); *Y10T 29/49108* (2015.01)

(58) Field of Classification Search
CPC ............ H01M 10/61; H01M 10/6567; H01M 10/6555; H01M 10/613; H01M 2/00; H01M 10/0525; F28F 3/12; Y10T 29/49108; F28D 1/0341; F28D 2021/0043
See application file for complete search history.

(56) References Cited

U.S. PATENT DOCUMENTS

| 3,229,763 A | 1/1966 | Rosenblad |
| 6,709,783 B2 | 3/2004 | Ogata et al. |

(Continued)

FOREIGN PATENT DOCUMENTS

| CA | 1229377 A1 | 11/1987 |
| JP | 2000048867 A | 2/2000 |

(Continued)

OTHER PUBLICATIONS

Machine-generated English Translation of JP 2000048867, obtained via Espacenet Patent Search.
(Continued)

*Primary Examiner* — Nicholas P D'Aniello
*Assistant Examiner* — Philip A. Stuckey
(74) *Attorney, Agent, or Firm* — McCoy Russell LLP

(57) ABSTRACT

A heat exchanger for use with at least two battery modules, each of the battery modules comprising at least one battery cell housed within a rigid container, the heat exchanger defining an internal fluid passage for a heat exchanger fluid and having at least one compliant region that is configured to be compressed to facilitate thermal contact between the heat exchanger and the two battery modules.

6 Claims, 31 Drawing Sheets

Related U.S. Application Data

(60) Provisional application No. 61/389,301, filed on Oct. 4, 2010.

(51) Int. Cl.
*F28D 21/00* (2006.01)
*H01M 10/0525* (2010.01)

(56) References Cited

U.S. PATENT DOCUMENTS

| | | |
|---|---|---|
| 2002/0102454 A1 | 8/2002 | Zhou et al. |
| 2002/0195237 A1 | 12/2002 | Luz et al. |
| 2004/0142238 A1 | 7/2004 | Asahina et al. |
| 2005/0089750 A1 | 4/2005 | Ng et al. |
| 2006/0115720 A1 | 6/2006 | Kim |
| 2007/0285051 A1 | 12/2007 | Jeon et al. |
| 2008/0110595 A1 | 5/2008 | Palanchon |
| 2008/0311468 A1 | 12/2008 | Hermann et al. |
| 2011/0189525 A1 | 8/2011 | Palanchon et al. |

FOREIGN PATENT DOCUMENTS

| | | |
|---|---|---|
| JP | 2005518642 A | 6/2005 |
| WO | 2011094863 A1 | 8/2001 |
| WO | 2003071616 A1 | 8/2003 |

OTHER PUBLICATIONS

Machine-generated English Translation of JP 2005518642, obtained via J-PlatPat.

International Search Report and Written Opinion of PCT/CA2011/050620, dated Dec. 14, 2011.

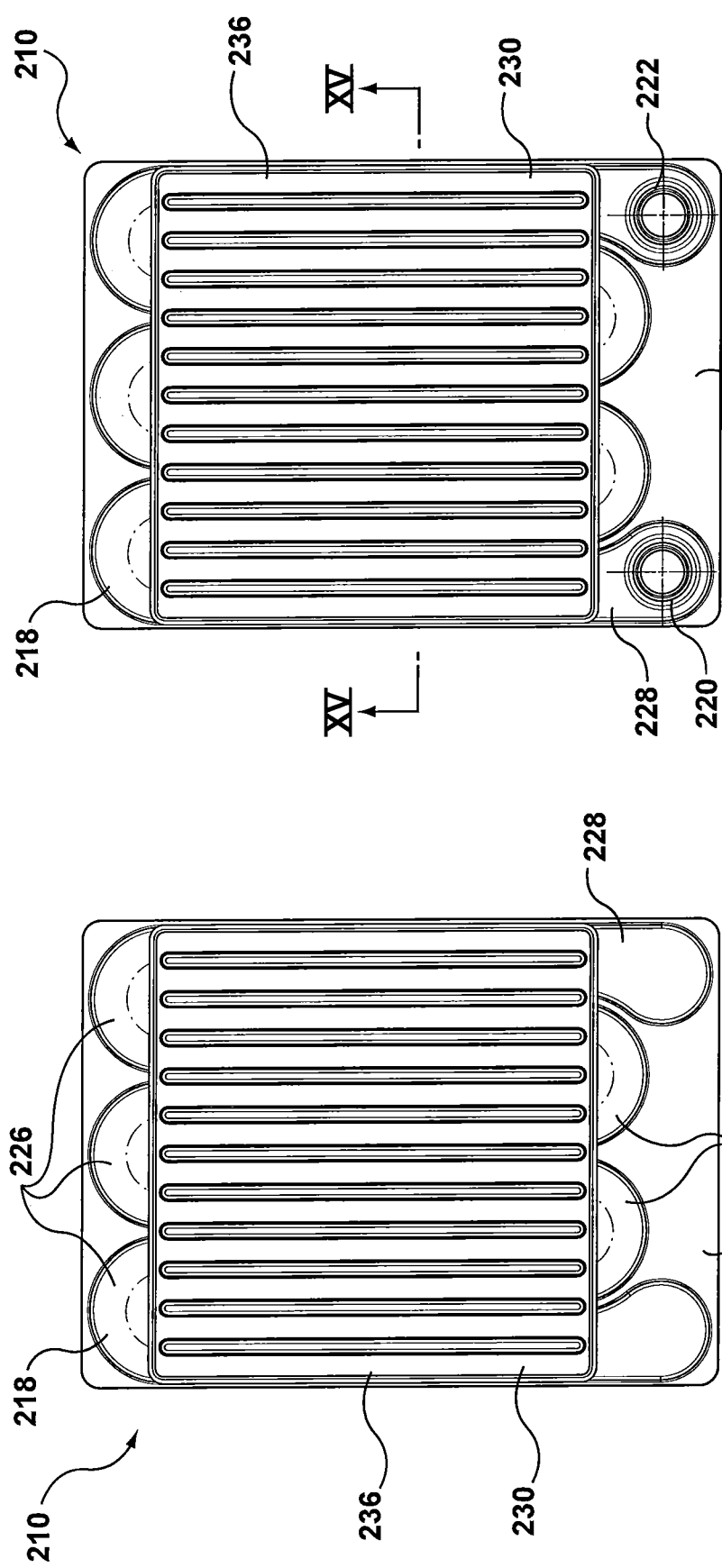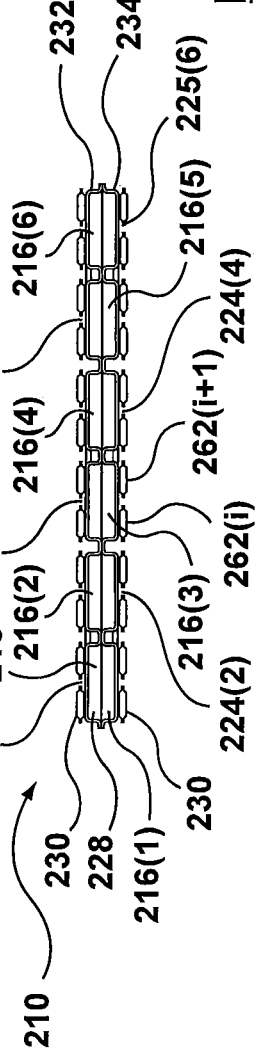
FIG. 13
FIG. 14
FIG. 15

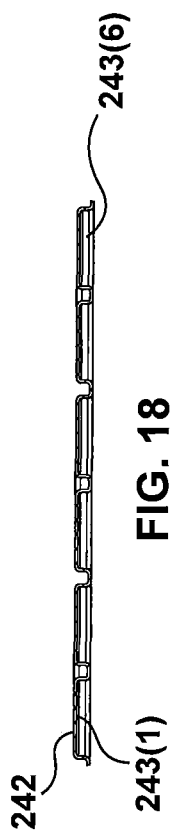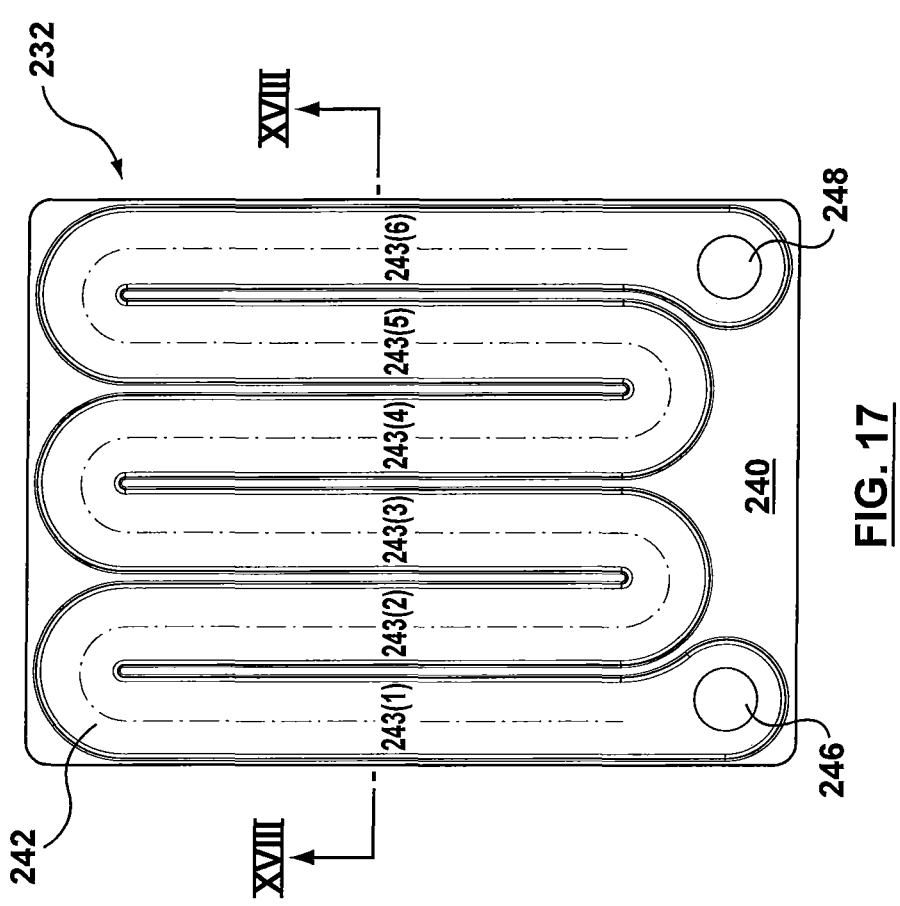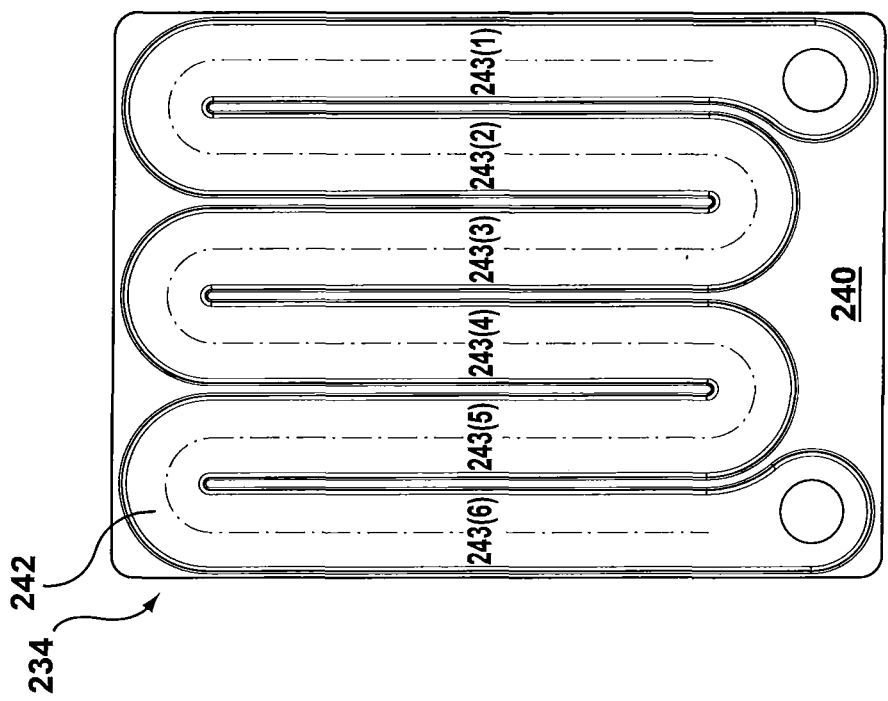

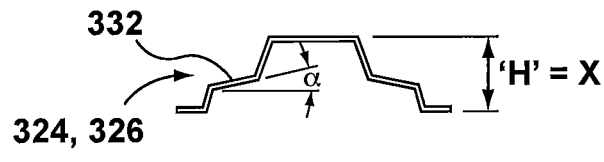
(A)
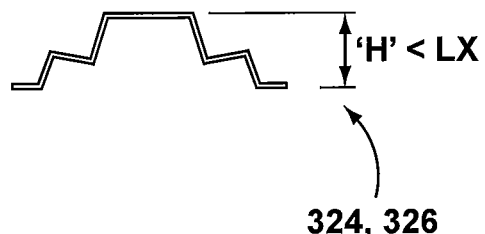
(B)
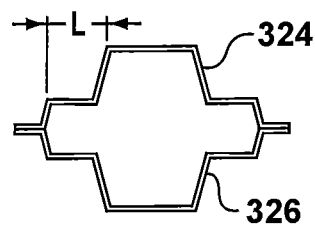
(C)
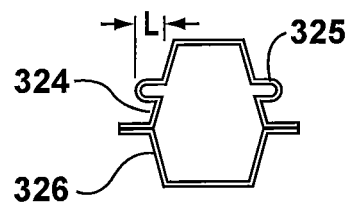
(D)
FIG. 26

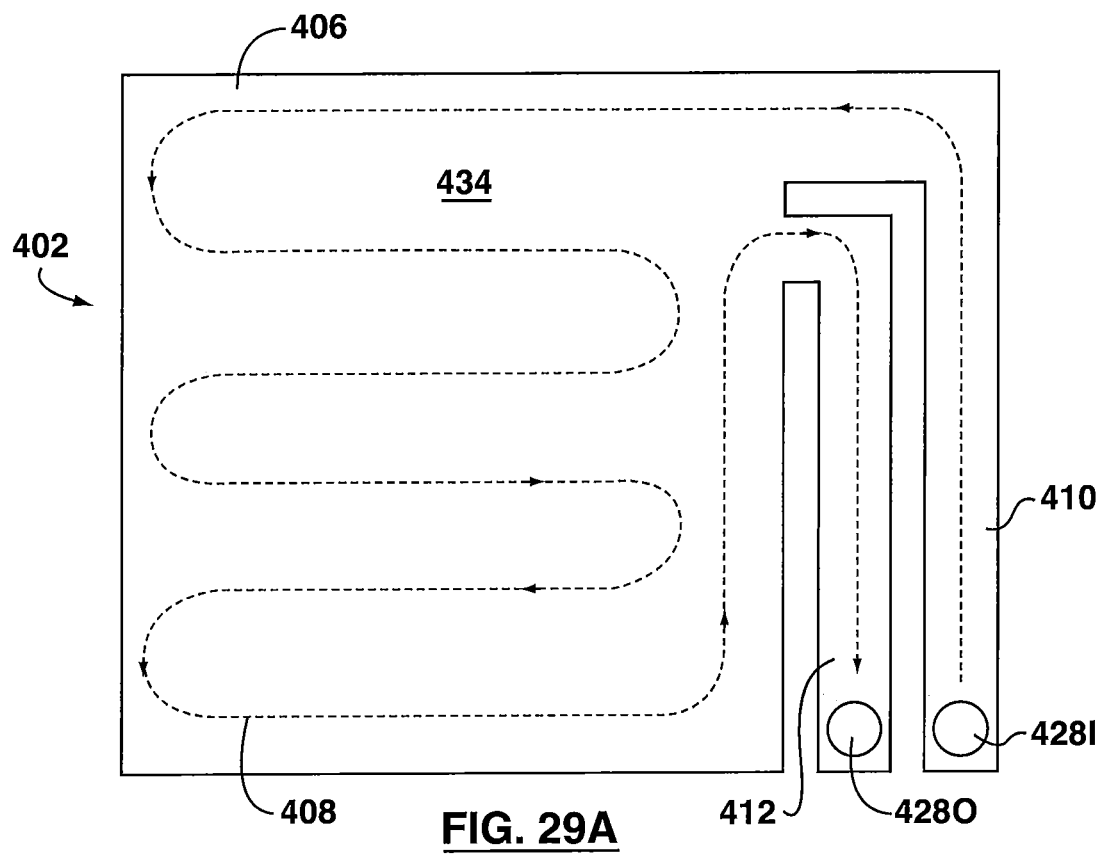
FIG. 29A
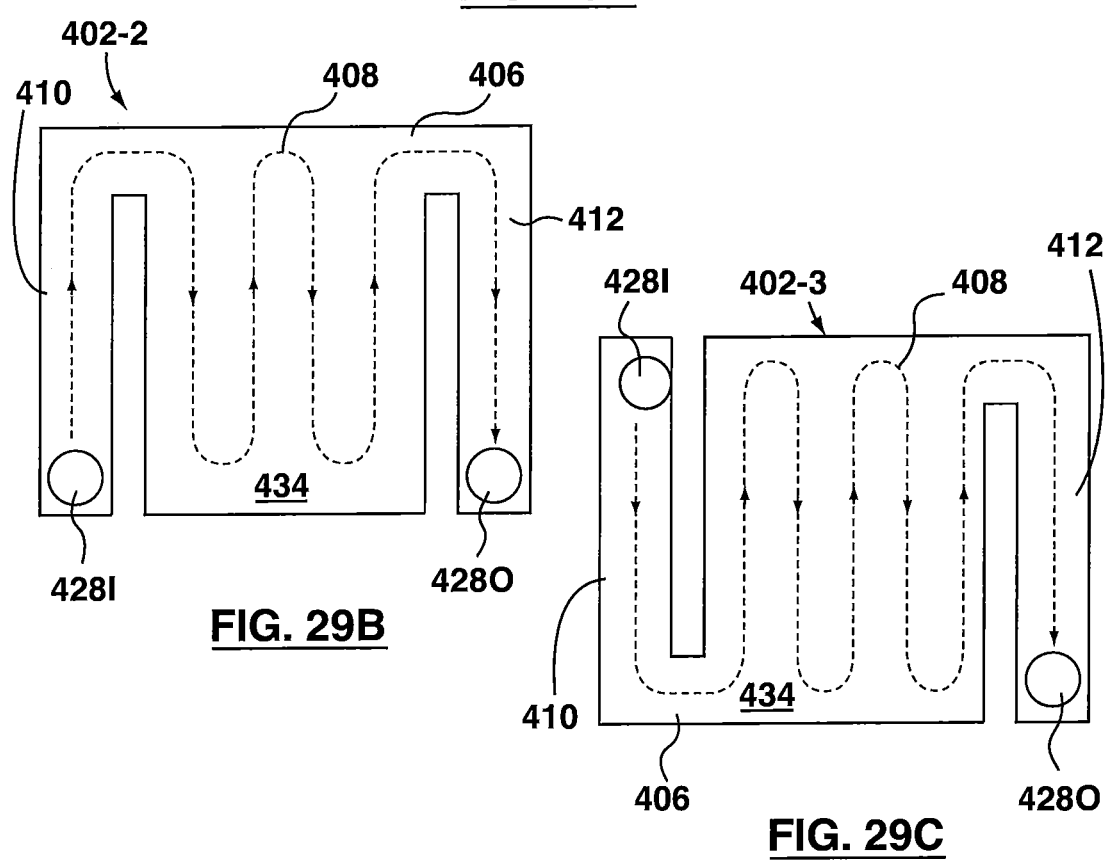
FIG. 29B
FIG. 29C

CONFORMAL FLUID-COOLED HEAT EXCHANGER FOR BATTERY

CROSS-REFERENCE TO RELATED APPLICATION

This application is a divisional application based on U.S. patent application Ser. No. 13/261,622 filed May 28, 2013 which claims the benefit of and priority to U.S. Provisional Patent Application No. 61/389,301 filed Oct. 4, 2010 under the title CONFORMAL FLUID-COOLED HEAT EXCHANGER FOR BATTERY CELL STACK.

The content of the above patent applications are hereby expressly incorporated by reference into the detailed description hereof.

BACKGROUND

This disclosure relates to heat exchangers used to dissipate heat in rechargeable batteries and other electricity producing cells.

Rechargeable batteries such as batteries made up of many lithium-ion cells can be used in many applications, including for example in electric vehicle ("EV") and hybrid electric vehicle ("HEV") applications among other things. Such batteries can generate large amounts of heat that needs to be dissipated.

SUMMARY

According to an example embodiment of the present disclosure there is provided a heat exchanger for use with at least two battery modules, each of the battery modules comprising at least one battery cell housed within a rigid container, the heat exchanger comprising:
a plurality of substantially rigid planar heat exchanger plates that each include a main plate section defining an internal fluid passage and an inlet panel and an outlet panel that are joined to the main plate section and define an inlet fluid passage and an outlet fluid passage, respectively, that communicate with the internal fluid passage, each of the panels being compliantly joined to the main plate section such that the main plate section can be displaced relative to the panels, the inlet and outlet panels of at least some of the heat exchanger plates being joined to the inlet and outlet panels of adjacent heat exchanger plates to form a stack of spaced apart, substantially parallel, heat exchanger plates, the main plate sections being compressible together to engage battery modules inserted therebetween.

According to another example embodiment of the present disclosure there is provided a heat exchanger for exchanging thermal energy with battery modules, comprising:
a plurality of heat exchanger plates, each heat exchanger plate defining an internal fluid flow passageway for a heat exchanger fluid and arranged in a stack in which adjacent heat exchanger plates are spaced apart from each other, the adjacent heat exchanger plates each including:
 a main plate section;
 an inlet panel defining an inlet fluid passage in fluid communication with the internal fluid flow passageway; and
 an outlet panel defining an outlet fluid passage in fluid communication with the internal fluid flow passageway;
wherein the inlet and outlet panel are each compliantly joined to the main plate section such that the main plate section can be displaced relative to the inlet and outlet panels, the inlet and outlet panels of one heat exchanger plate being joined, respectively, to the inlet and outlet panels of at least one adjacent heat exchanger plate to form a stack of spaced apart, substantially parallel heat exchanger plates, the main plate sections being movable relative to their respective inlet and outlet panels at least prior to insertion of battery modules between the heat exchanger plates.

According to another example embodiment of the present disclosure there is provided a method of assembling a battery unit comprising:
providing a substantially rigid heat exchanger having at least one compliant region, wherein providing the heat exchanger comprises:
providing a plurality of substantially rigid and planar heat exchanger plates that each include a main plate section defining an internal fluid passage and an inlet panel and an outlet panel that are joined to the main plate section and define an inlet fluid passage and an outlet fluid passage, respectively, that communicate with the internal fluid passage, each of the panels being compliantly joined to the main plate section such that the main plate section can be displaced relative to the panels, and
rigidly joining the inlet and outlet panels of at least some of the heat exchanger plates to the inlet and outlet panels of adjacent heat exchanger plates to form a stack of spaced apart, substantially parallel, heat exchanger plates; and
providing at least two battery modules, each of the battery modules comprising at least one battery cell housed within a rigid container; and
inserting a battery module between adjacent pairs of the heat exchanger plates such that the heat exchanger plates and battery modules are interleaved; and
compressing the main plate sections together for contact with the battery modules.

BRIEF DESCRIPTION OF DRAWINGS

FIG. 13 is a plan view of one side of the heat exchanger of FIG. 12.

FIG. 14 is a plan view of the opposite heat exchanger of FIG. 12.

FIG. 15 is a sectional view of the heat exchanger taken across the lines XV-XV of FIG. 14.

FIG. 16 is plan view of a first core plate of the heat exchanger of FIG. 12.

FIG. 17 is a plan view of a second core plate of the heat exchanger of FIG. 12.

FIG. 18 is a sectional view of the second core plate taken across the lines XVIII-XVIII of FIG. 17.

FIG. 26 illustrates various compliant boss configurations that can be applied to the heat exchanger of FIG. 22.

FIGS. 29A, 29B and 29C are top plan views of respective embodiments of a heat exchanger.

DESCRIPTION OF EXAMPLE EMBODIMENTS

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

Figure 1:
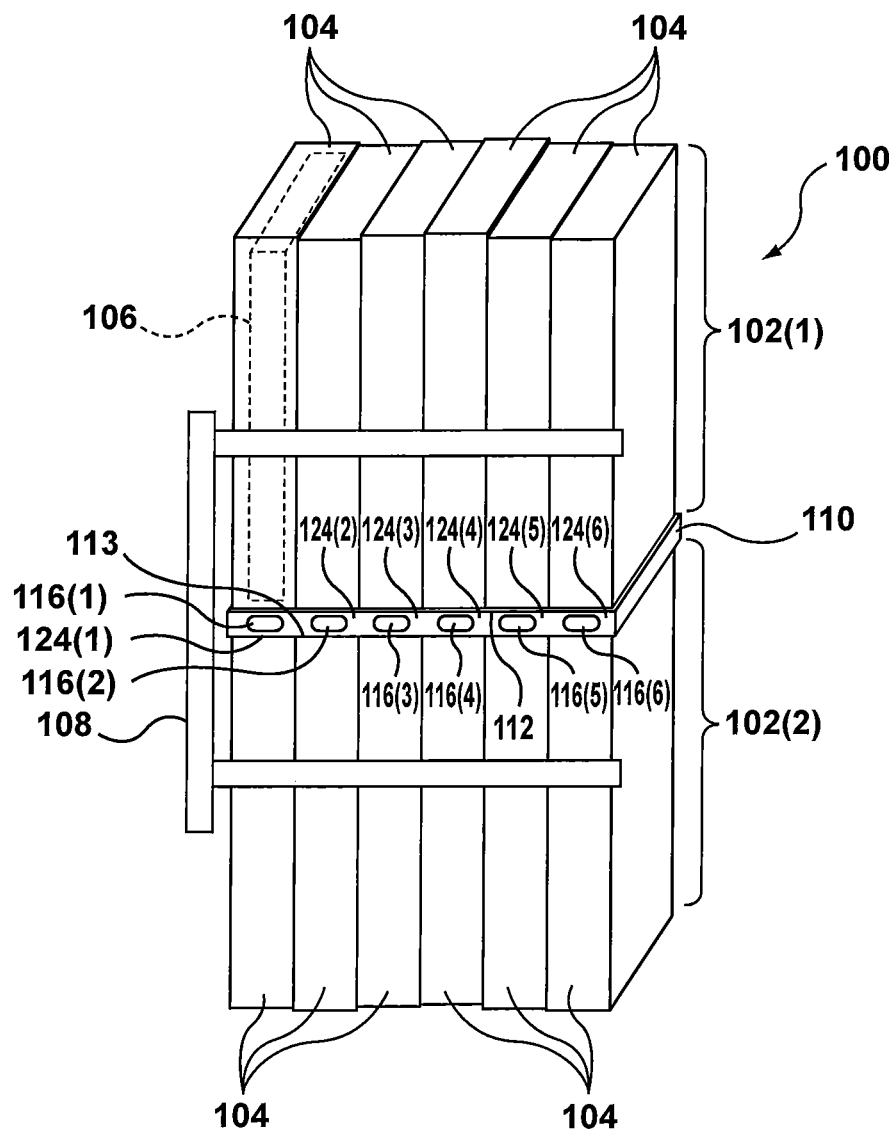
FIG. 1 is a schematic perspective view of a battery unit according to an example embodiment.

FIG. 1 shows an illustrative example of a rechargeable battery unit 100 according to example embodiments of the invention. The battery unit 100 is made up of battery stacks or modules 102(1) and 102(2) (generically referred to as 102(i) herein) which in turn are made of battery cell containers 104 that each house one or more battery cells 106. The illustrated embodiment includes two rectangular box-like modules 102(i), each of which is made up of six horizontally arranged cell containers 104, with each cell container 104 housing one or more battery cells 106. The number of modules 102(i) in the battery unit 100, the number of cell containers 104 in each module 102, and the number of battery cells 106 in each battery cell container 104 can vary and the orientation and shape of these components can vary as well from application to application and accordingly the quantities and orientation in this description are provided as an example of an illustrative embodiment only.

In at least some example embodiments, battery cells 106 are lithium-ion battery cells, however other rechargeable battery cells could be used. In some embodiments, battery cells 106 are prismatic lithium-ion battery cells. In other example embodiments, battery cells 106 have cylindrical or other shapes. In the illustrated embodiment, each battery cell container 104 includes a rectangular substantially rigid box-like case housing one or more battery cells 106. In some embodiments, all of the cell containers 104 within a module 102(i) are substantially identical and the modules 102(i) that make up a battery unit 100 are substantially identical. In example embodiments, the battery modules 102 (i) may be mounted side by side or one above the other in a support frame or rack 108. In some embodiments battery cell container 104 may be non-rigid.

Figure 2:
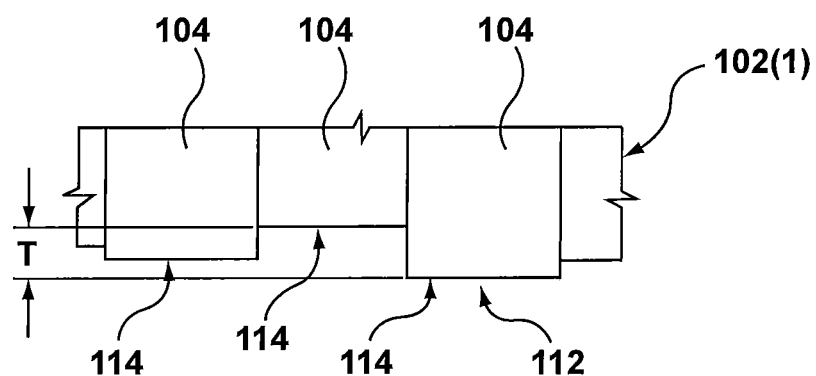
FIG. 2 is an enlarged front view illustrating part of three adjacent battery cell containers of one of the battery modules of the battery unit of FIG. 1.

According to example embodiments, a heat exchanger 110 is located between opposing surfaces 112 and 113 of adjacent battery modules 102(1) and 102(2). The contact surfaces 112 and 113 between the respective modules 102(1) and 102(2) and the intermediate heat exchanger 110 may not be perfectly flat surfaces, and furthermore may be subject to distortion due to expansion and contraction during heating and cooling. By way of example, FIG. 2 illustrates a contact surface 112 defined by the heat exchanger contacting sides 114 of three adjacent battery cell containers 104 in the upper module 102(1). As a result of manufacturing tolerances of the cell containers 104, as well as module assembly tolerances, the cell containers 104 may not be perfectly identical or perfectly aligned. As a result, the heat exchanger contacting sides 114 are not aligned, resulting in a heat exchanger contact surface 112 that is not planer, but rather includes small height transitions at the boundaries between adjacent cell containers 104. As shown in FIG. 2, "T" represents a maximum displacement tolerance between the heat exchanger contacting sides 114 of the cell containers 104 in a module 102. By way of non-limiting example, tolerance T could for example be in the range of 0.5 mm to 1 mm in some applications, however tolerance outside this range may also exist in some applications.

Accordingly, a heat exchanger 110 that can maintain consistent contact with the geometry of the cell containers 104 between adjacent modules 102(i) over a range of temperatures and contact surface tolerances and provide good heat conductivity is desirable in some applications. In this regard, example embodiments relate to a heat exchanger structure that is dimensionally compliant to maintain contact with battery cells containers 104 across the battery unit 100 even if the battery cell containers do not define a planar heat exchanger contact surface. In some examples, the dimensionally compliant heat exchanger 110 compresses under expansion of the first and second battery modules and expand under subsequent contraction of the first and second battery modules such that the heat exchanger structure remains in thermal contact with the battery cell containers 104 throughout a range of normal battery operating temperatures.

Figure 3:
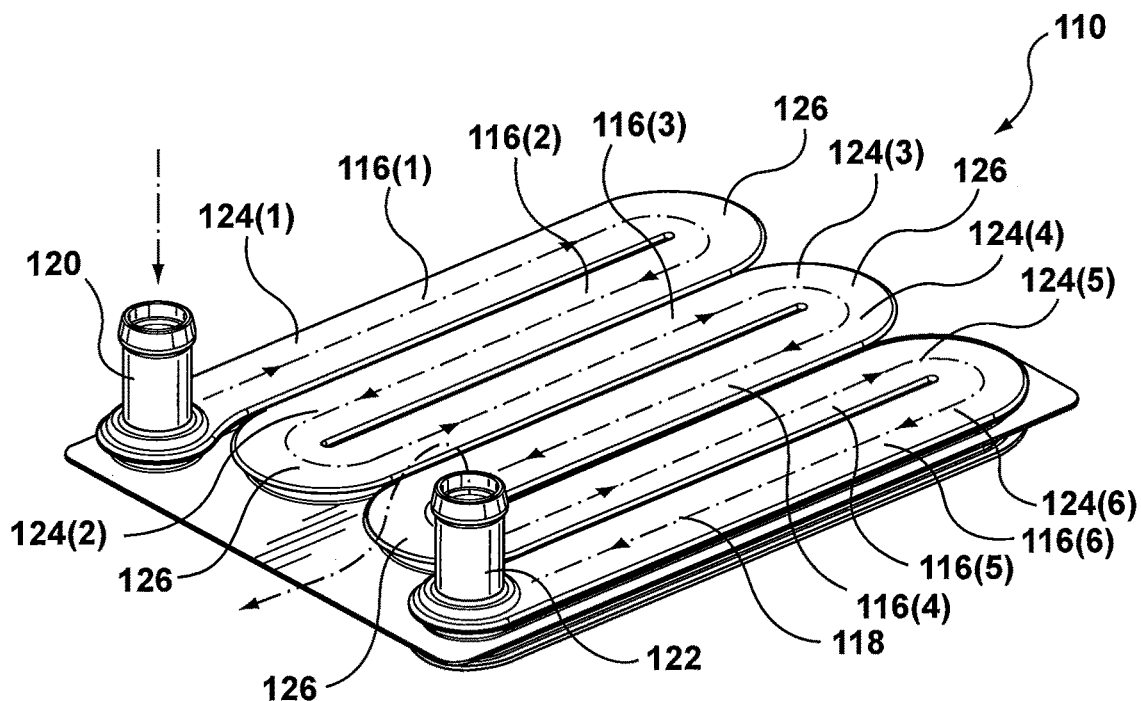
FIG. 3 is a perspective view of a fluid-cooled heat exchanger according to an example embodiment.
Figure 4:
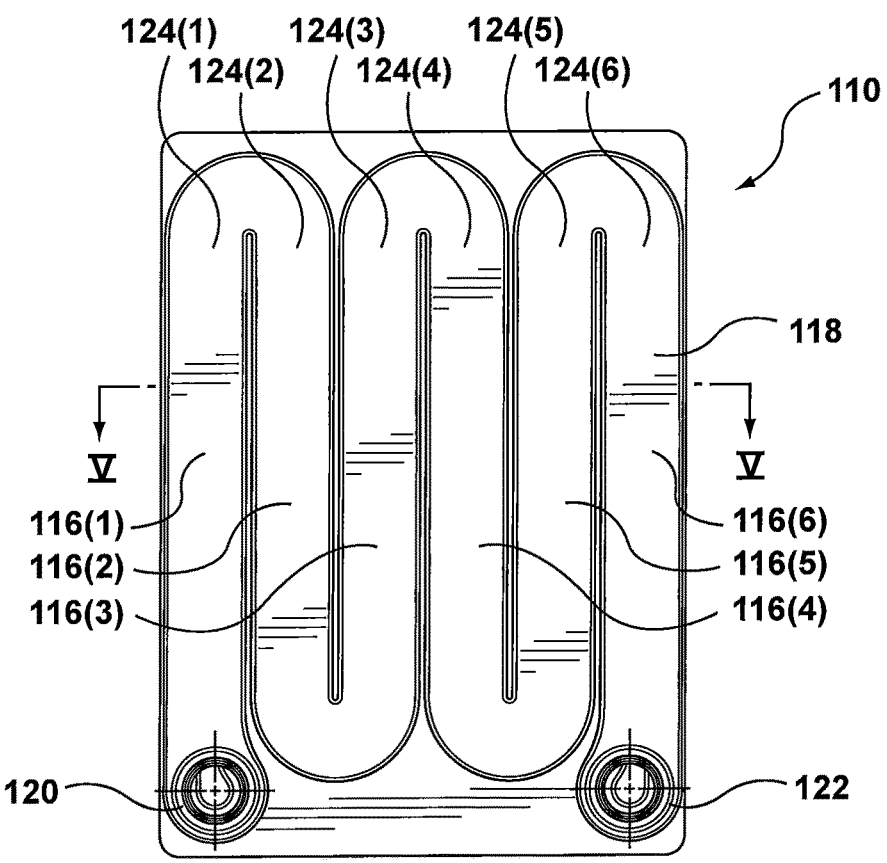
FIG. 4 is a plan view of the heat exchanger of FIG. 3.

Referring to FIGS. 3 and 4, in one example embodiment, the heat exchanger 110 is a multi-pass plate-type heat exchanger that defines an internal serpentine heat exchanger fluid flow passage 118 having a first end in fluid communication with an inlet fixture 120 and a second end in fluid communication with an outlet fixture 122. In the illustrated example, the serpentine fluid flow passage 118 includes multiple serially connected parallel fluid chambers 116(1)-116(6) (generically referred to using reference number 116 (*i*) herein and represented by dashed lines in FIG. 3), with each fluid chamber being joined to a successive fluid chamber by a respective substantially U-shaped flow passage 126. In operation, a heat exchange fluid such as a cooling fluid enters fluid inlet fixture 120, flows through fluid chamber 116(1), through a first U-turn passage 126 into fluid chamber 116(2) and then through a second U-turn passage 126 into fluid chamber 116(3) and so on until the fluid flows through the final fluid chamber 116(6) and exits from outlet fixture 122. The heat exchanger fluid travelling through internal flow passage 118 could for example be a cooling liquid such as water or other liquid or gaseous fluid refrigerant for drawing heat away from battery cell containers 104. In some example embodiments, the heat exchanger fluid travelling through internal flow passage 118 could for example be a heating liquid for heating battery cell containers 104.

As schematically represented in FIG. 1, in one example embodiment each fluid chamber **116(*i*) is positioned between a cell container 104 located in one module 102(1) and an opposing cell container 104 located in the adjacent module 102(2). In the illustrated example, the heat exchanger includes six parallel fluid chambers 116(1)-116 (6), with each fluid chamber 116** (*i*) being located between a respective opposing pair of battery cell containers 104 in the battery unit 100, however the number of fluid chambers may be less than or more than six depending on the specific application. In some example embodiments, the U-shaped regions that define U-turn passages 126 are exposed and extend outward beyond the sides of battery modules 102(1), 102(2) such that the U-turn passages 126 are not positioned between the battery cell containers 104. In some example embodiments, the U-shaped regions are not exposed and are positioned between the battery modules 102(1), 102(2). The fluid chambers 116(1)-116(6) are each formed within a respective fluid chamber region 124(1)-124(6) (generically referred to using reference number **124(*i*) herein) of the heat exchanger 110. As will be explained in greater detail below, in example embodiments, each of the fluid chamber regions 124(*i*) is individually conformable independently of the other fluid chamber regions 124(*i*) of the heat exchanger 110 such that inter-cell container variances in opposing surfaces 112, 113 between the adjacent modules 102(1) and 102(2) can be accommodated by the heat exchanger 110**.

Figure 5:
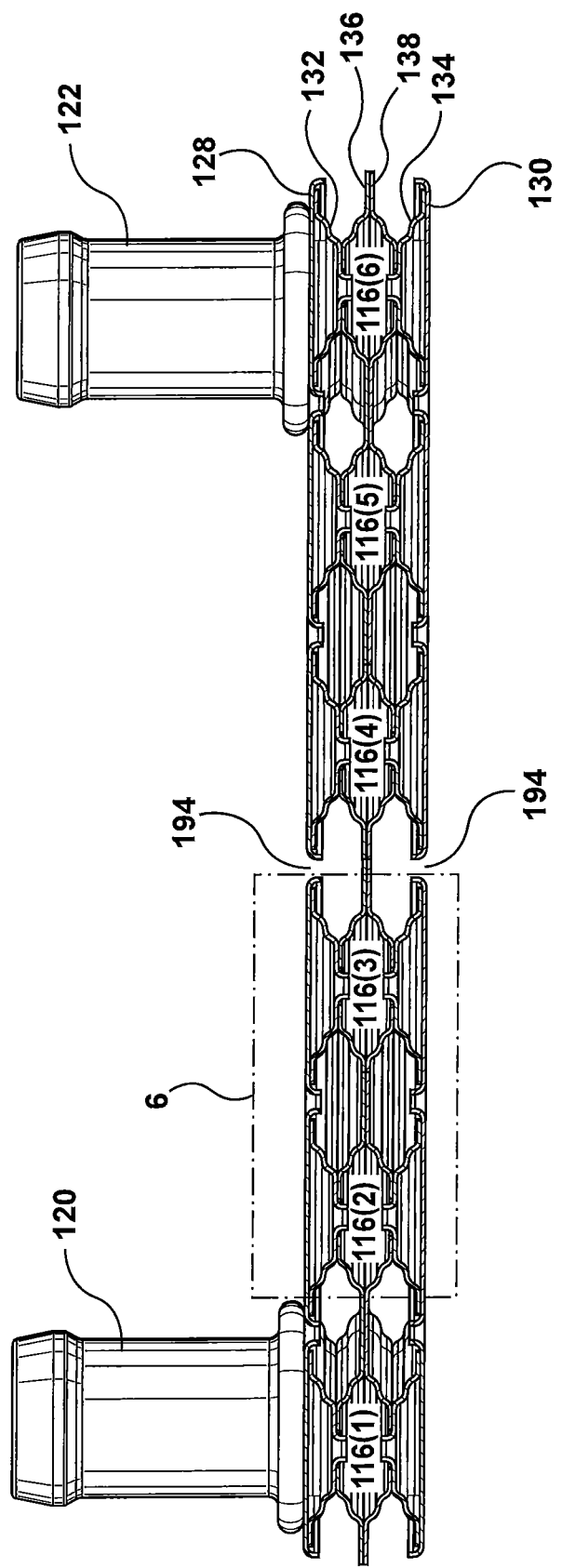
FIG. 5 is a sectional view of the heat exchanger taken across the lines V-V of FIG. 4.
Figure 6:
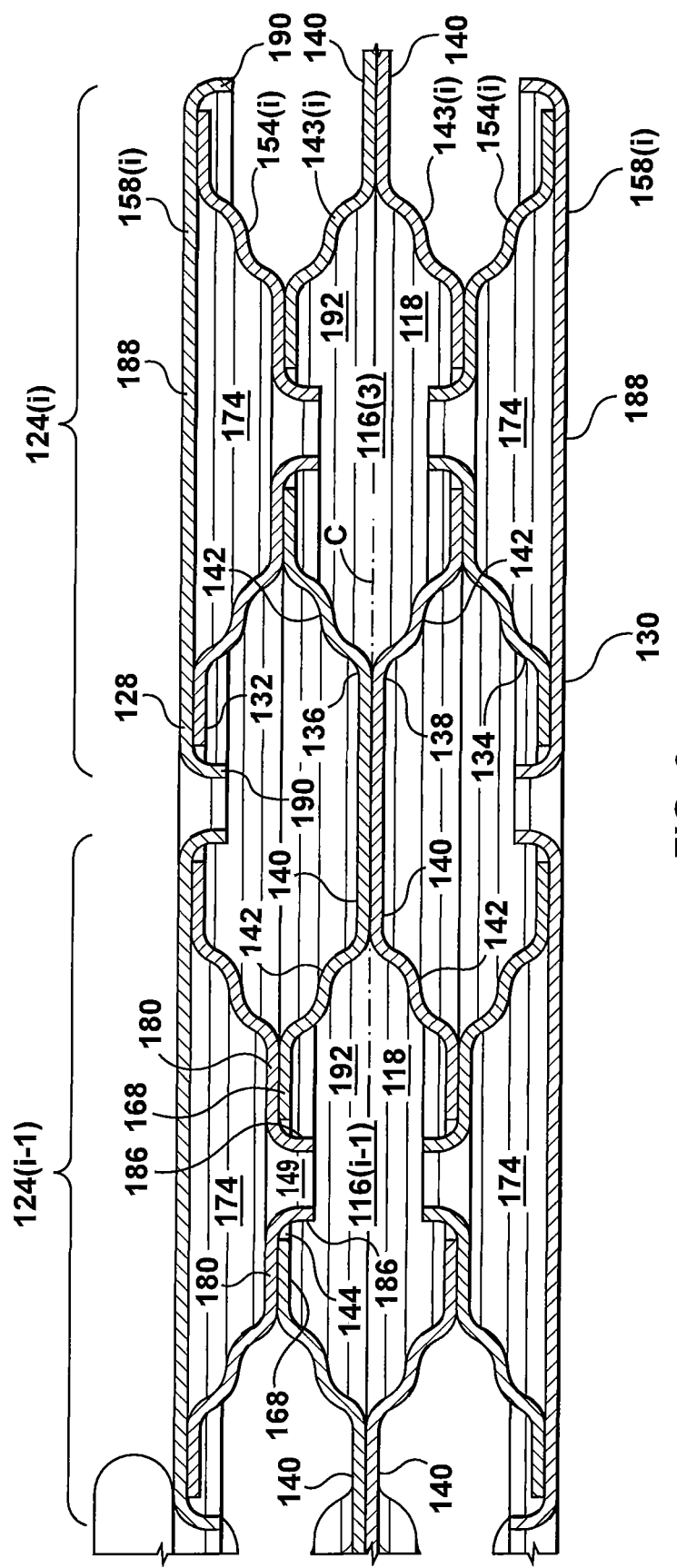
FIG. 6 is an enlarged view of portion 6 of FIG. 5.
Figure 7:
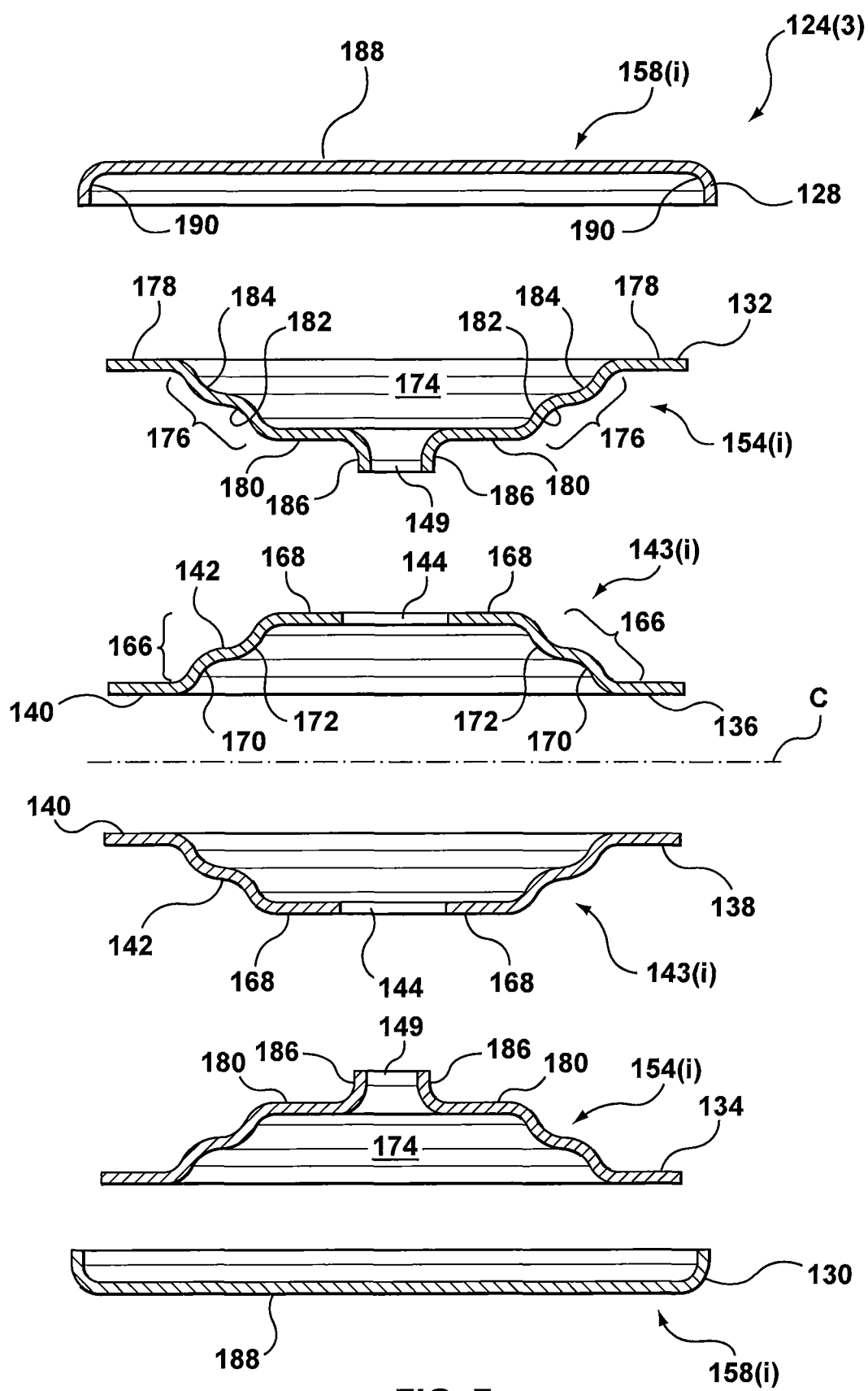
FIG. 7 is an exploded view of a flow chamber region of FIG. 6.

Referring to the sectional views of the heat exchanger 110 shown in FIGS. 5-7, in one example embodiment the body of heat exchanger 110 is formed from six plates that are laminated together, namely first and second outer cover plates 128, 130; first and second outer core plates 132, 134; and first and second inner core plates 136, 138. In an example embodiment, the plates are each formed from roll formed or stamped aluminum or aluminum alloy and are brazed together to form the body of the heat exchanger 110. However, the heat exchanger could alternatively be formed from other resilient metals or materials, including plastics, and other processes.

Figure 8:
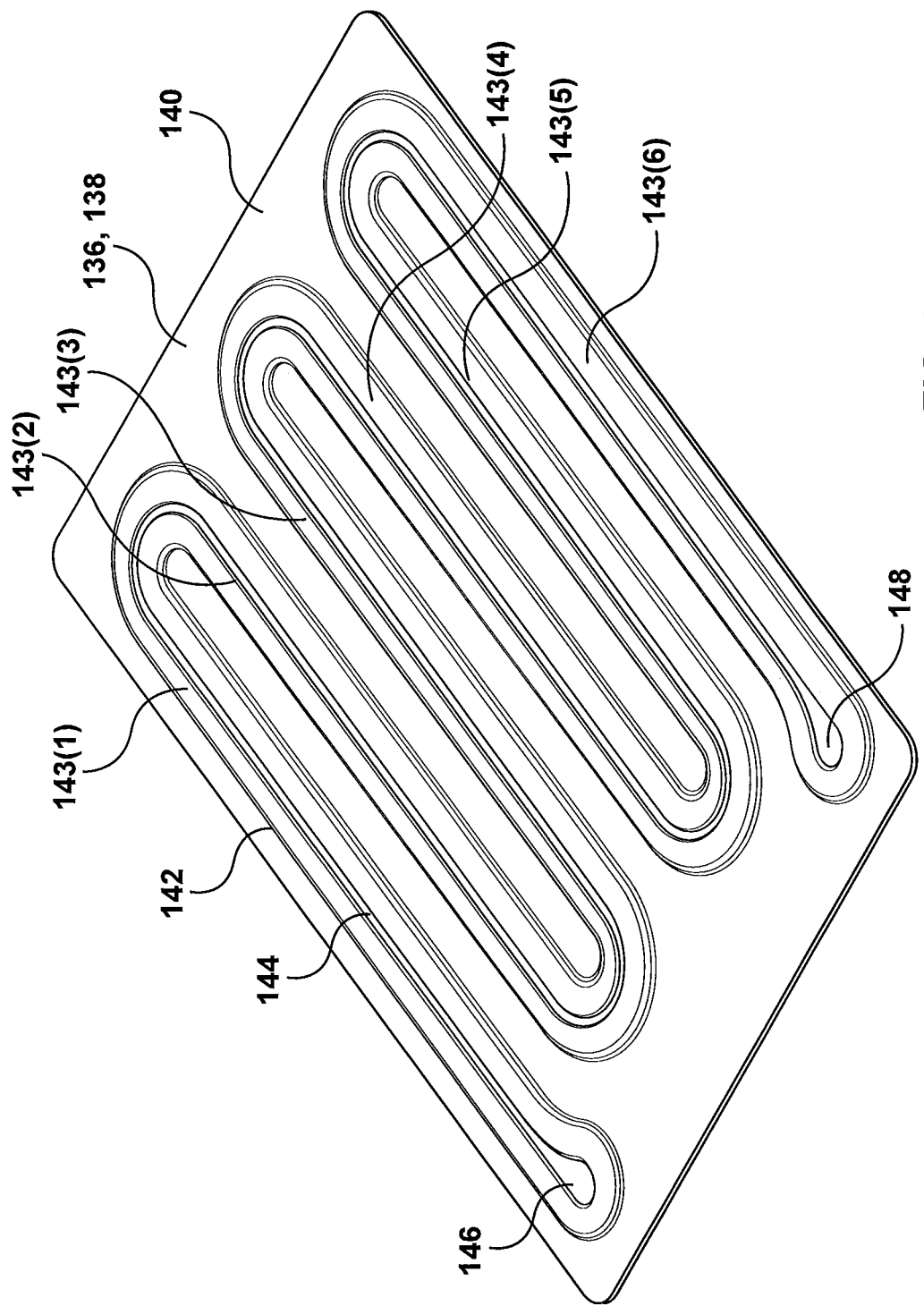
FIG. 8 is a perspective view of an inner core plate of the heat exchanger of FIG. 3.

In an example embodiment, first and second inner core plates 136 and 138 are substantially identical, and in this regard FIG. 8 shows a perspective view of an example of an inner core plate 136, 138. The inner core plate 136, 138 includes a rectangular planar plate portion 140 having a raised serpentine boss 142 formed thereon. The serpentine boss 142 conforms to the shape of internal flow passage 118 and includes parallel inner core plate regions 143(1)-143(6) (referred to generically by reference **143(*i*)) that correspond to respective flow chamber regions 124(1)-124(6). A serpentine slot 144 is provided along the length of the serpentine boss 142. The slot 144 terminates in enlarged inlet and outlet openings 146, 148**, respectively, at its opposite ends.

Figure 9:
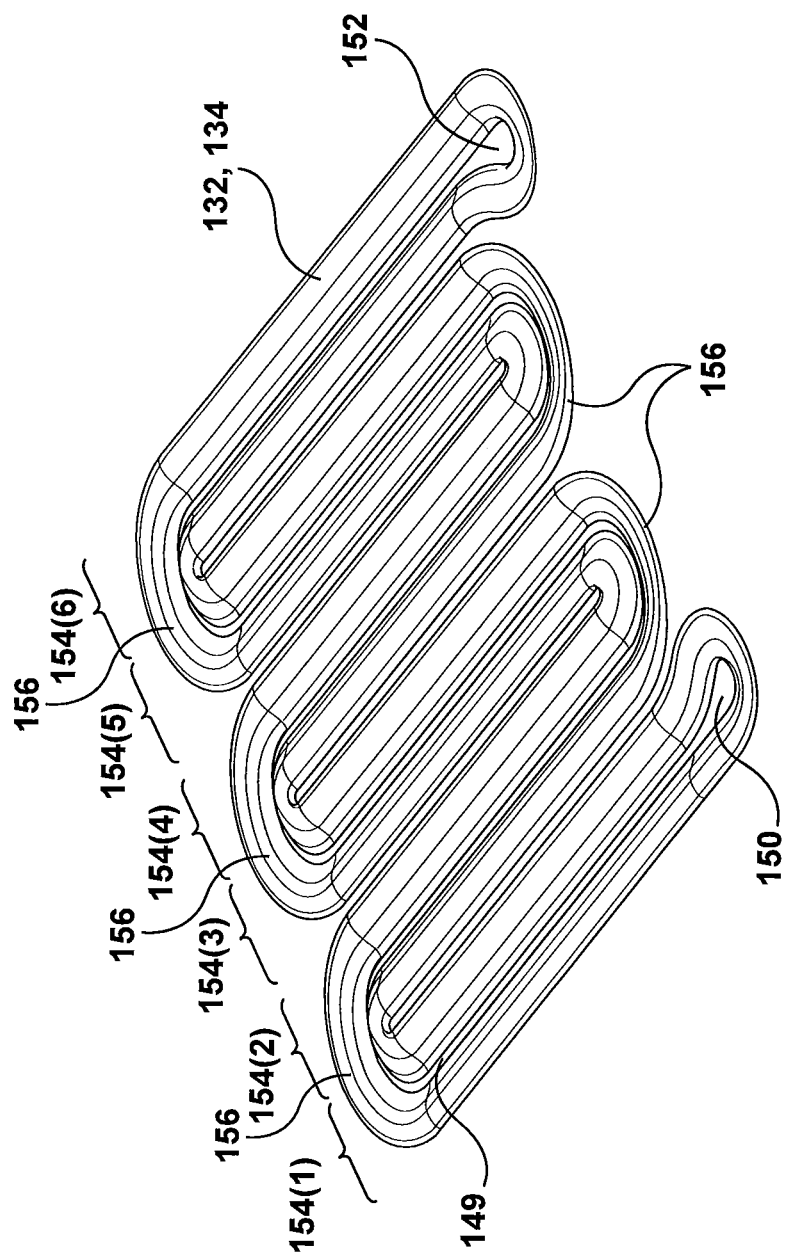
FIG. 9 is a perspective view of an outer core plate of the heat exchanger of FIG. 3.

In an example embodiment, first and second outer core plates 132 and 134 are also substantially identical, and in this regard FIG. 9 shows a perspective view of an example of an outer core plate 132, 134. The outer core plate 132, 134 is a serpentine member that conforms to the shape of internal flow passage 118. The core plate 123, 134 includes serially connected parallel core plate regions 154(1)-154(6) (referred to generically by reference **154(*i*)) that correspond to respective flow chamber regions 124(1)-124(6). Adjacent core plate regions 154(*i*) are joined by substantially U-shaped portions 156 at alternating ends of the plate 132, 134. The configuration of core plate 132, 134 allows a degree of physical isolation between each of the core plate regions 154(*i*) such that each of the core plate regions 154(*i*) can be resiliently compressed independently of the other core plate regions 154(*i*). A serpentine slot 149 is provided along the core plate 132, 134 and terminates in enlarged inlet and outlet openings 150, 152**, respectively, at its opposite ends.

Figure 10:
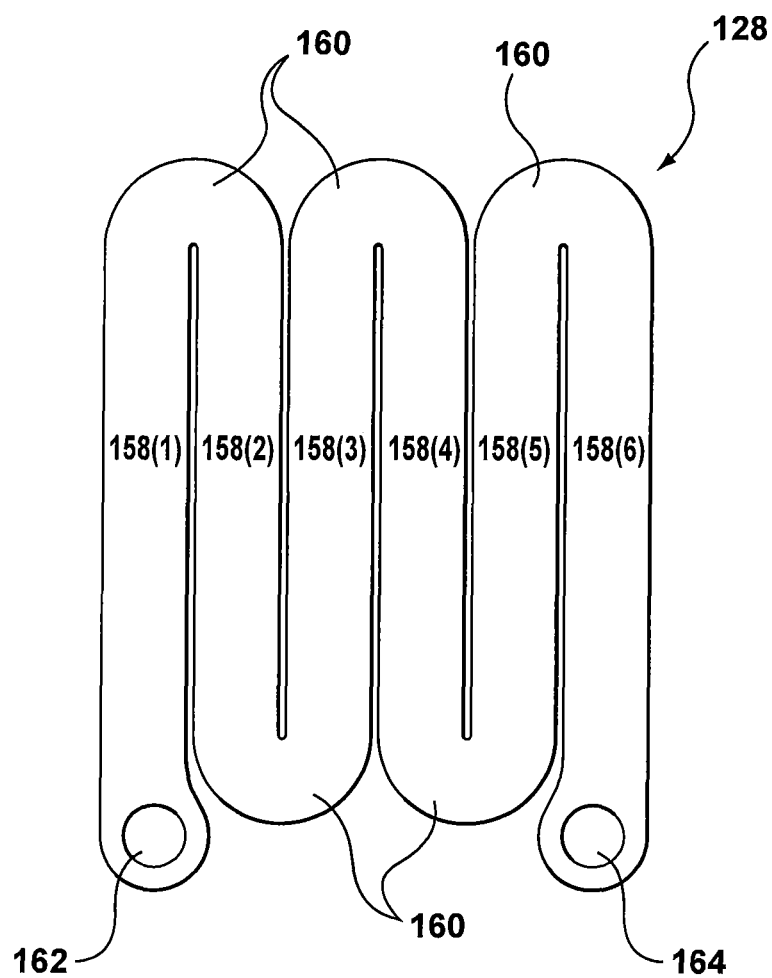
FIG. 10 is a plan view of a first closure plate of the heat exchanger of FIG. 3.

FIG. 10 is a plan view of an example of a substantially planar first cover plate 128. The first cover plate 128 is also a serpentine member that conforms to the shape of internal flow passage 118. The cover plate 128 includes serially connected parallel first cover plate regions 158(1)-158(6) (referred to generically using reference **158(*i*)) that correspond to respective flow chamber regions 124(1)-124(6). Adjacent first cover plate regions 158(*i*) are joined by substantially U-shaped portions 160 at alternating ends of the plate 128. The configuration of first cover plate 128 allows a degree of physical isolation between each of the first cover plate regions 158(*i*) such that each of the cover plate regions 158(*i*) can be displaced towards the center of the head exchanger body independently of the other cover plate regions 158(*i*). Enlarged inlet and outlet openings 162, 164 are provided a respective opposite ends of the serpentine cover plate 128**.

Figure 11:
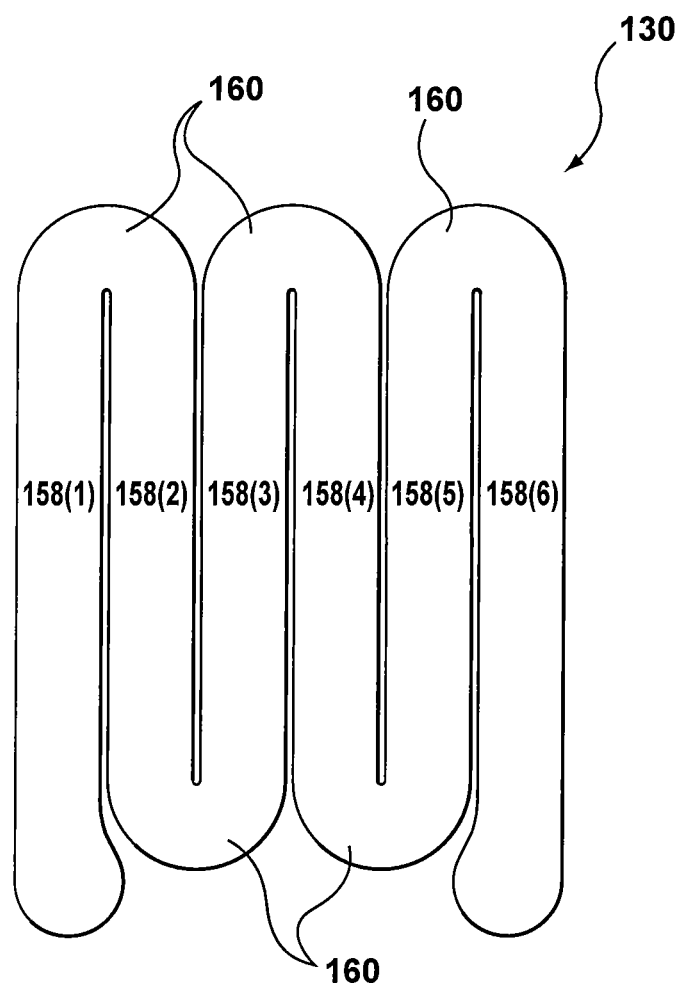
FIG. 11 is a plan view of a second closure plate of the heat exchanger of FIG. 3.
Figure 12:
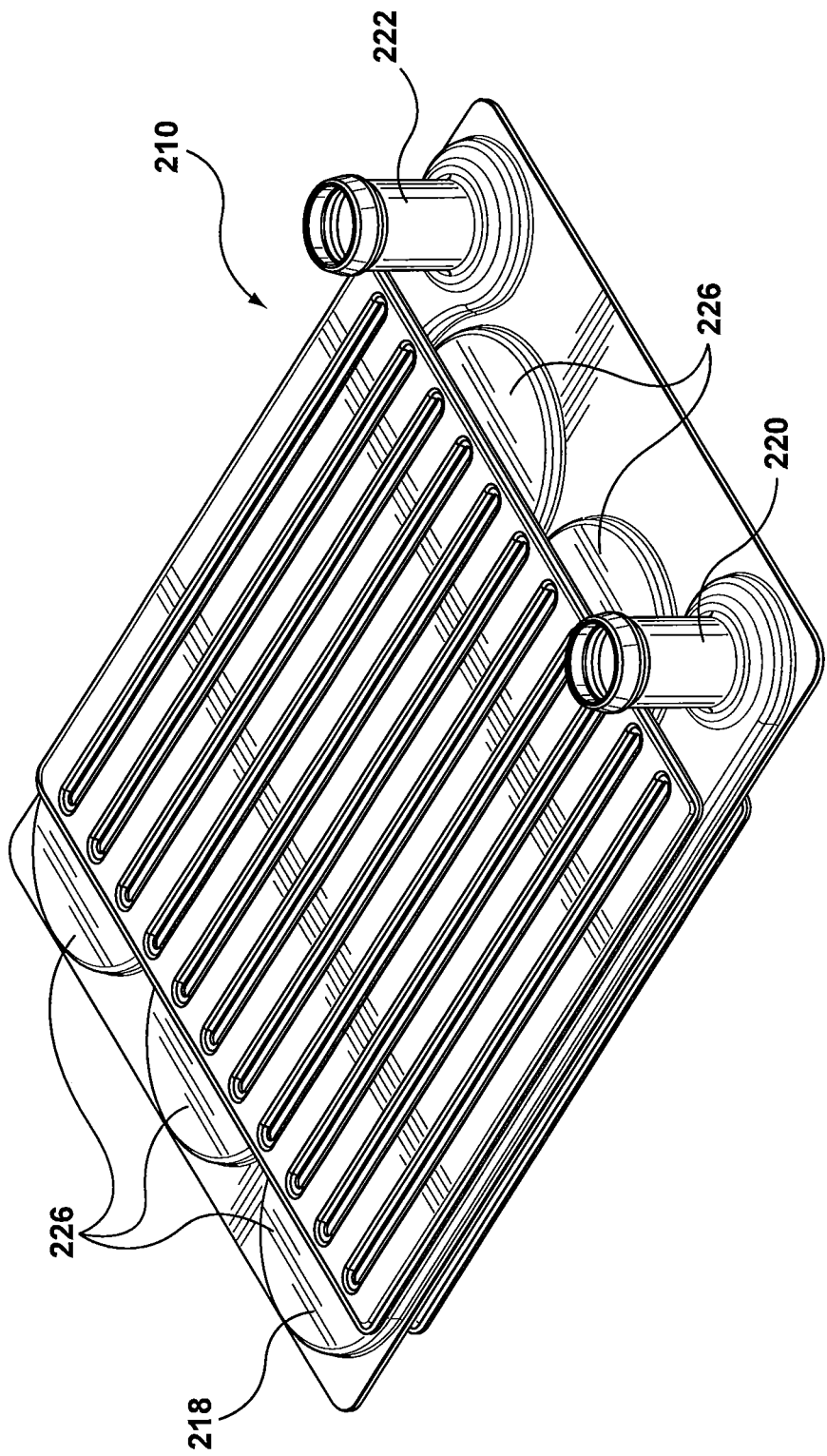
FIG. 12 is a perspective view of a fluid-cooled heat exchanger according to another example embodiment.

FIG. 11 is a plan view of an example of a substantially planar second cover plate 130. The second cover plate 130 is a serpentine member that is substantially identical to first cover plate 128 however the second cover plate does not include inlet and outlet openings 162, 164. The same reference numbers are used in the Figures for similar elements in cover plates 128 and 130.

Features of the plates 128, 130, 132, 134, 136 and 138 and their assembly will now be explained in greater detail with reference to the sectional views of FIGS. 6 and 7. In the heat exchanger 110, inner core plates 136 and 138 are joined face to face with their respective planar plate portions 140 in contact with each other and their respective raised boss portions 142 extending away from a centerline C of the heat exchanger body. For explanatory purposes, the term "inner" as used herein indicates a direction towards the centerline C, and the term "outer" indicates a direction away from the centerline C unless the context suggests otherwise. The raised boss portion 142 of the first inner core plate 136 and the second inner core plate 138 are aligned together to partially define the internal serpentine flow passage 118. As seen in FIG. 7, the raised boss portion 142 of each of first and second inner core plates 136, 138 is formed by opposing sidewalls 166 that extend from the planar plate portion 140 and which each terminate at a planar flange 168 that defines the serpentine slot 144. The planar flanges 168 are substantially parallel to the planar plate portion 140. In an example embodiment, each sidewall 166 has first arcuate wall portion 170 that curves outward relative to the centerline C and a second arcuate wall portion 172 that curves inward relative to the centerline C, thereby providing the sidewall 166 with a profile that generally approximates an "S" shape. In some example configurations, such a sidewall profile provides the raised boss 142 with a degree of resilient conformability such that the boss 142 can be deformed under pressure towards centerline C and then spring back to a normal shape when the pressure is removed. The generally S-shaped sidewall profile can in some example embodiments distribute stress so as to reduce fatigue, however other sidewall configurations can alternatively be used to reduce fatigue.

First outer core plate 132 and second outer core plate 134 are secured on opposite sides of centerline C to the first inner core plate 136 and second inner core plate 138, respectively. Each serpentine outer core plate 132, 134 defines a serpentine channel 174 that opens outward relative to the centerline C and forms part of internal serpentine flow passage 118. In particular the channel 174 is defined by a pair of opposed sidewalls 176. The sidewalls 176 each extend from an outer planer peripheral flange 178 to an inner planar flange 180, with the outer flange 178 and the inner flange 180 having substantially parallel opposite facing surfaces. In the illustrated embodiment, each sidewall 176 has first arcuate wall portion 182 that curves outward relative to the centerline C and a second arcuate wall portion 184 that curves inward relative to the centerline C, thereby providing the sidewall 176 with a profile that generally approximates an "S" shape. In one example the inner flanges 186 each terminate at an inwardly extending lip 186, with the lip 186 on one flange 180 opposing the lip 186 on the other flange 180 to define the serpentine slot 149.

The inner flanges 180 of first outer core plate 132 mate with respective planar portions 168 of the first inner core plate 136 to secure the first outer core plate 132 to the first inner core plate 136. As illustrated in FIGS. 6 and 7, the outer core plate serpentine slot 149 is aligned with the inner core plate serpentine slot 144, with the opposed lips 186 of the outer core plate extending into the inner core plate serpentine slot 144. The positioning of the outer core plate lips 186 within the inner core plate slot 144 provides a mechanical interlock between the inner and outer core plate strengthening the joint therebetween and also assists in providing a seal against inter plate leakage, and can assist in aligning the plates during assembly of the heat exchanger. In some configurations, the positioning of the outer core plate lips 186 within the inner core plate slot 144 can act as a limit on the extent to which the flow chamber region 124(i) can be deformed. In some example embodiments other deformation limiting features may be provided in various regions of the body of the heat exchanger to limit deformation of such regions. The second outer core plate 134 is secured to the second inner core plate 138 in a similar manner that the first outer core plate 132 is secured to the first inner core plate 136. In some example embodiments the interlock between the inner and outer core plates can be reversed with the lips 186 being provided on the inner core plate rather than the outer core plate and then inserted into the slot 149 on the outer core plate.

In some example embodiments, the generally S-shaped profile of the outer core plate 132, 134 sidewalls 176 provides the outer core plates 132, 134 with a degree of resilient conformability such that the outer core plates can be deformed under pressure towards centerline C and then spring back to a normal shape when the pressure is removed. The generally S-shaped sidewall profile can in some example embodiments distribute stress so as to reduce fatigue; however other sidewall configurations can al alternatively be used to reduce fatigue.

In the illustrated embodiment, the serpentine first outer cover plate 128 is secured to an outer side of the serpentine first outer core plate 132 to seal the first outer core plate channel 174. Each of the cover plate regions 158(i) and U-shaped portions includes a planar central region 188 having inwardly directed flanges 190 along the opposite peripheral edges thereof. Peripheral sections of the planar central region 188 mate with the planar outer flanges 178 of the first outer core plate 132, with the outer core plate planar outer flanges 178 being nested within the inwardly directed flanges 190 of the first outer cover plate 128. The serpentine second outer cover plate 130 is secured in a similar manner to an outer side of the serpentine second outer core plate 134 to seal the second outer core plate channel 174. The inwardly directed flanges 190 may in some embodiments assist in positioning of the cover plates during assembly, and can also have a deflection or deformation limiting effect on the flow chamber regions. In the illustrated embodiment of heat exchanger 110, the inlet openings 146 of the inner core plates 136, 138, the inlet openings 150 of the outer core plates 132, 134 and the inlet opening of the outer cover plate 128 are aligned to form a fluid inlet to the heat exchanger internal flow passage 118, with inlet fixture 120 secured to the outer cover plate 128. Similarly, the outlet openings 148 of the inner core plates 136, 138, the outlet openings 152 of the outer core plates 132, 134 and the outlet opening of the outer cover plate 128 are aligned to form a fluid outlet to the heat exchanger internal flow passage 118, with outlet fixture 122 secured to the outer cover plate 128. The second cover plate 130 seals the heat exchanger fluid inlet and fluid outlet on the side of the heat exchanger opposite the side to which the inlet and outlet fixtures 120, 122 are located. Referring again to FIG. 6, in the presently described example embodiment, each fluid chamber 116(i) of each fluid region 124(i) includes three communicating flow areas, namely the channel 174 that is defined by first cover plate 128 and first outer core plate 132, the channel 174 that is defined by second cover plate 130 and second outer core plate 134, and the central channel 192 that is defined between inner core plates 136, 138. As a result of slots 144, 149, the channels 174, 192 are in fluid communication along the entire length serpentine flow passage 118.

The planar central regions 188 of the inner and outer cover plates 128, 130 provide a physical interface with the battery cell containers 104 of the battery unit 100. Thus, in an example embodiment, each fluid chamber region 124(i)

of the heat exchanger 110 has a first cover plate elongate region 158(*i*) that engages a respective battery cell container 104 in the first battery module 102(1) and a second cover plate elongate region 158(*i*) that engages, on the opposite side of the heat exchanger, a respective battery cell container 104 in the second first battery module 102(1). In this regard, each fluid chamber region 124(*i*) of the heat exchanger 110 is secured between and provides heat exchange surfaces with a pair of opposed battery cell containers 104. As will be appreciated from the above description, the sidewalls 176 of the outer core plates 132, 134 and the sidewalls 166 of the inner core plates 136, 138 are configured to provide resilient compressibility of each of the parallel fluid chamber regions 124(*i*). Furthermore, physical separation by elongate slots 194 (see FIG. 5 for example) between the parallel regions 154(*i*) of the outer core plates 132, 134 allows the fluid chamber regions 124(*i*) to each be individually compliant to the physical separation between the two battery cell containers 104 that the fluid chamber region 124(*i*) is located between. The pressure of the heat exchanger fluid within the flow chambers 116(*i*) can effect the compressibility of the fluid flow regions 124(*i*) in some example embodiments.

By way of non-limiting examples, in some applications, the plates used to form the heat exchanger 110 may be formed from H3534 aluminum braze sheet and/or 3003 aluminum. Alternative plate configurations can be used to achieve similar results—for example, fewer than six plates can be used to form a heat exchanger having individually compliant flow regions.

FIGS. 12-15 show a further example of a heat exchanger 210 that can be used as an alternative to heat exchanger 110 in some applications. The heat exchanger 210 is similar in function and construction to heat exchanger 110 except for differences that will be apparent from the Figures and the following description. In an example embodiment, the heat exchanger 210 includes a substantially rigid core plate structure 228 that is sandwiched between substantially planar first and second compliant plate structures 230. In example embodiments, the compliant plate structures 230 are each configured to be resiliently deformable such that the heat exchanger 210 is dimensionally compliant to the space between the first battery module 102(1) and the second battery module 102(2). The core plate structure 228 of heat exchanger 210 defines an internal serpentine heat exchanger fluid flow passage 218 having a first end in fluid communication with an inlet fixture 220 and a second end in fluid communication with an outlet fixture 222. In the illustrated example, the serpentine fluid flow passage 218 includes multiple serially connected parallel fluid chambers 216(1)-216(6) (generically referred to using reference number 216 (*i*) herein—see FIG. 15), with each fluid chamber being joined to a successive fluid chamber by a respective substantially U-shaped flow passage 226. In operation, a heat exchange fluid such as a cooling fluid enters fluid inlet fixture 220, flows through fluid chamber 216(1), through a first U-turn passage 226 into fluid chamber 216(2) and then through a second U-turn passage 226 into fluid chamber 216(3) and so on until the fluid flows through the final fluid chamber 216(6) and exits from outlet fixture 222.

As with heat exchanger 110, in one example embodiment each fluid chamber 216(*i*) of heat exchanger 210 is positioned between a cell container 104 located in one module 102(1) and an opposing cell container 104 located in the adjacent module 102(2).

The fluid chambers 216(1)-216(6) are each formed within a respective fluid chamber region 224(1)-224(6) (generically referred to using reference number 224(*i*) herein) of the core plate structure 228 of the heat exchanger 210.

Referring to the sectional views of the heat exchanger 210 shown in FIG. 15, the heat exchanger core plate structure 228 is formed from opposed first and second core plates 232, 234; and the first and second compliant plate structures 230 are each formed from opposed compliant plates 236. In an example embodiment, the plates are each formed from roll formed or stamped aluminum or aluminum alloy and are brazed together to form the body of the heat exchanger 210. However, the heat exchanger could alternatively be formed from other resilient metals or materials, including plastics, and other processes.

In an example embodiment, first and second core plates 232 and 234 are substantially identical, and in this regard FIGS. 16 and 17 show plan views of examples of core plate 234 and 232, respectively. The core plates 234 and 232 each include a rectangular planar plate portion 240 having a raised serpentine boss 242 formed thereon. The serpentine boss 242 conforms to the shape of internal flow passage 218 and includes parallel core plate regions 243(1)-243(6) (referred to generically by reference 243(*i*)) that correspond to respective flow chamber regions 224(1)-224(6). A difference between first core plate 232 and second core plate 234 is that inlet and outlet openings 246, 248, are formed respectively, at the opposite ends of the raised boss 242 of first core plate 232.

Figure 19:
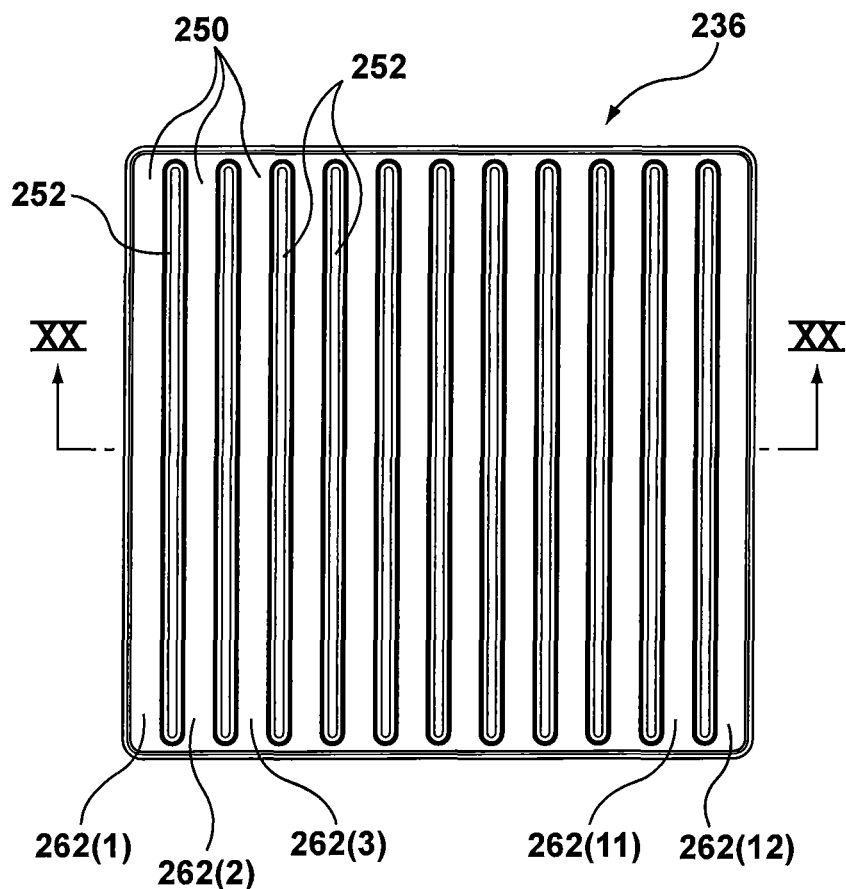
FIG. 19 is a plan view of a compliant plate of the heat exchanger of FIG. 12.
Figure 20:
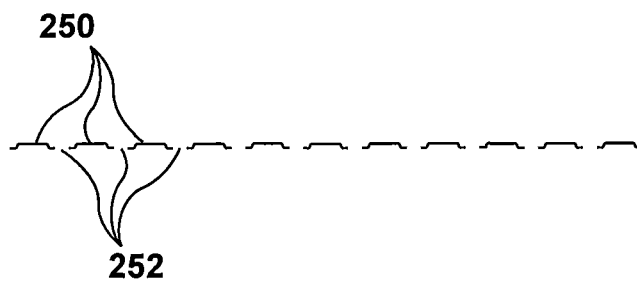
FIG. 20 is a sectional view of the compliant plate taken across the lines XX-XX of FIG. 19.
Figure 21:
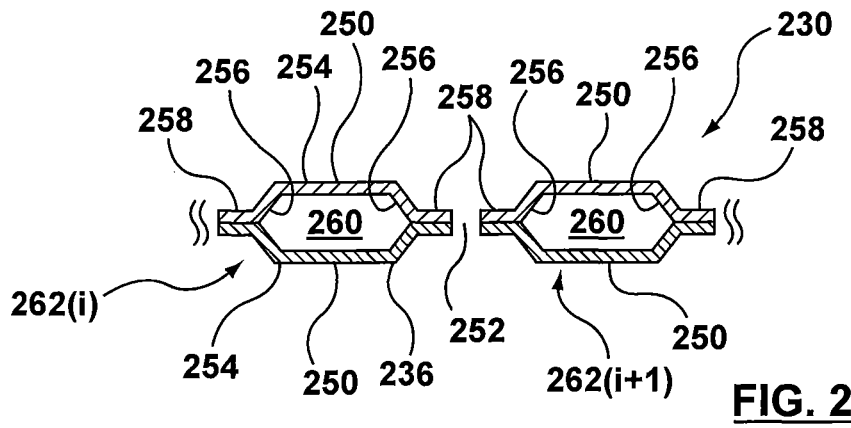
FIG. 21 is an enlarged sectional view of part of a compliant plate structure of the heat exchanger of FIG. 12.

In an example embodiment, first and second compliant plates 236 that form the compliant plate structures 230 are substantially identical, and in this regard FIGS. 19 and 20 show an example of a compliant plate 236. In the illustrated example, compliant plate 236 is a rectangular plate that includes a plurality of raised parallel, elongate bosses 250 that are separated by slots 252 that extend through the plate. FIG. 21 is an enlarged partial sectional view showing two compliant plates 236 opposingly mated to form a compliant plate structure 230. As seen in FIG. 21, each of the elongate bosses 250 includes a planar central wall that is bordered by sidewalls 256 which each terminate at a peripheral planer flange 258. The flanges 258 from one compliant plate 236 mate with the flanges 258 from the opposing compliant plate 236 to form compliant plate structure 230. As seen in FIG. 21, the opposed bosses 250 from the mated compliant plates 236 define internal chambers 260 such that the mated compliant plates 236 define a plurality of parallel, elongate compliant chamber regions 262(1)-262(12) (generically referred to as 262(*i*) herein). In one example embodiment, chambers 260 are sealed chambers that are filled with a fluid or gas such as air or filled with a non-fluid thermal gasket. In another example embodiment, chambers 260 may be vented. In the illustrated embodiment, the compliant plate structure 230 includes twelve elongate compliant regions 262(*i*), two for each of the six flow chamber regions 224 (*i*) of the core plate structure 228.

In an example embodiment, the compliant regions 262(*i*) of the compliant plate structure 230 are each individually deformable such that each of the compliant regions 262(*i*) can be individually compressed up to a threshold amount under external pressure and then rebound back to its original shape when the pressure is removed.

In some example embodiments, the compliant plates 236 are formed from thinner material than the core plates 232, 234 with the result that the core plate structure 228 is relatively rigid compared to the compliant plate structures 230 that it is sandwiched between. By way of non limiting example, compliant plates 236 could be from aluminum having a thickness of 0.2 mm and the core plates 232, 234 formed from aluminum having a thickness of 0.6 mm, however many alternative thicknesses could be used.

Turning again to FIGS. 15-18, in the heat exchanger 210, first and second core plates 232, 234 are joined face to face with their respective planar plate portions 240 in contact with each other and their respective raised boss portions 242 extending away from each other to define the internal multi-pass serpentine heat exchanger fluid flow passage 218. Compliant plate structures 230 are provided on the opposite faces of the core plate structure 228 to provide an interface with the first battery module 102(1) and the second battery module 102(2), respectively. In the illustrated embodiment, one each side of the core plate structure 228, a pair of parallel elongate compliant chambers 262(i), 262(i+1) extend the length of each fluid chamber region 224(i). The compliant chambers 262(i) and 262(i+1) that are located on opposite sides of each fluid chamber region 224(i) permits each of the fluid chamber regions to be individually compliant to physical separation between the two battery cell containers 104 that the fluid chamber region 124(i) is located between.

Accordingly, in the embodiments of FIGS. 1 to 21, a heat exchanger 110, 210 is placed between two battery modules 102(1) and 102(2) that each include a plurality of battery cell containers. In some applications, the surfaces of the battery modules 12(1) and 102(2) that contact the opposite sides of the heat exchanger 110, 120 may not be perfectly flat due to a lack of perfect alignment of the battery cell containers that make up the battery modules 102(1) and 102(2). Thus, in at least some example embodiments, to help maintain contact between the battery module surfaces and the opposite sides of the heat exchanger 110, 210, the heat exchanger 110, 120 includes independently conformable regions that each have a spring effect such that each conformable region coincides with a respective pair of opposed battery cell containers and can adaptively flex under the compressive forces applied at the region. Accordingly, in at least some embodiments, when assembling a battery unit that includes battery modules 102(1), 102(2) and heat exchanger 110, 120, a compressive action or step occurs during which regions of the heat exchanger 110 undergo a degree of compression to facilitate good thermal contact between the battery modules 102(1), 102(2) and the heat exchanger 110, 120.

In some example embodiments the conformal heat exchanger configurations described above could be used between fuel cell modules in place of battery cell modules. Accordingly, the heat exchanger structures described herein can be used in a power producing unit that comprises a first module comprising a plurality of power producing cells such as battery cells or fuel cells and a second module comprising a plurality of power producing cells such as battery cells or fuel cells, the heat exchanger structure being disposed between opposing surfaces of the first stack and the second stack and defining one or a plurality of fluid flow passages, the heat exchanger structure being dimensionally compliant to accommodate different separation distances between opposing cells within the battery unit, and in some example embodiments, dimensionally compliant to compress under expansion of the first and second stacks and expand under subsequent contraction of the first and second stacks. In some example embodiments, an intermediate material or structure may be placed between the outer cover plates and the battery cell containers 104 to enhance thermal conduction and account for irregularity in the surface profiles of the individual battery cell containers.

In example embodiments, the conformal heat exchanger 110 described above includes compliant regions over substantially the entire fluid flow path defined by the heat exchanger. In some example embodiments, the compliancy of the heat exchanger may be more localized. In this regard, FIGS. 22-25 illustrate a battery unit 300 that incorporates a heat exchanger 302 having localized compliant regions according to further example embodiments, as will be explained in greater detail below. The battery heat exchanger 302 includes multiple (N) substantially identical spaced apart heat exchanger modules or plates 306(1) to 306(N) (generically referred herein using reference number 306) that are substantially aligned in a row or column. The battery unit 300 includes battery modules 304(1) to 304(N−1) (generically referred to using reference number 304) that are interleaved with the heat exchanger plates 306(1) such that at least one battery module 304 is located between and in thermal contact with the opposing surfaces of two adjacent heat exchanger plates 306.

Figure 24:
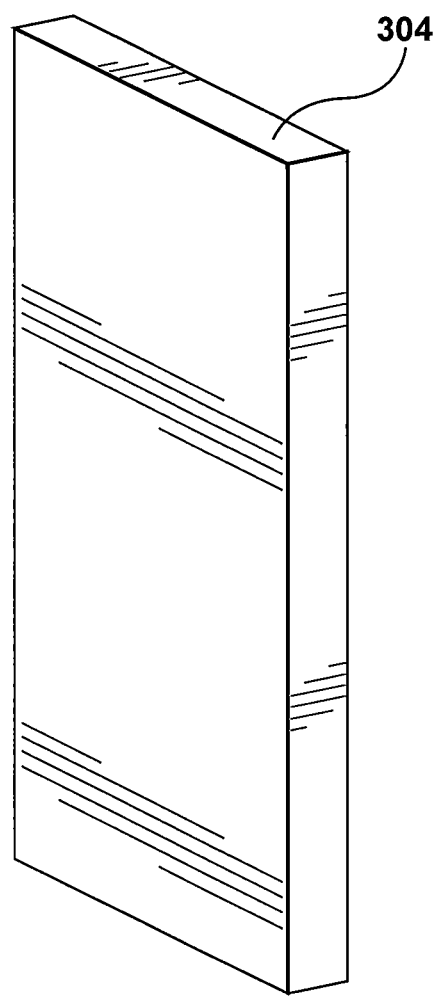
FIG. 24 is a perspective view of a battery module of the heat exchanger of FIG. 22.
Figure 25:
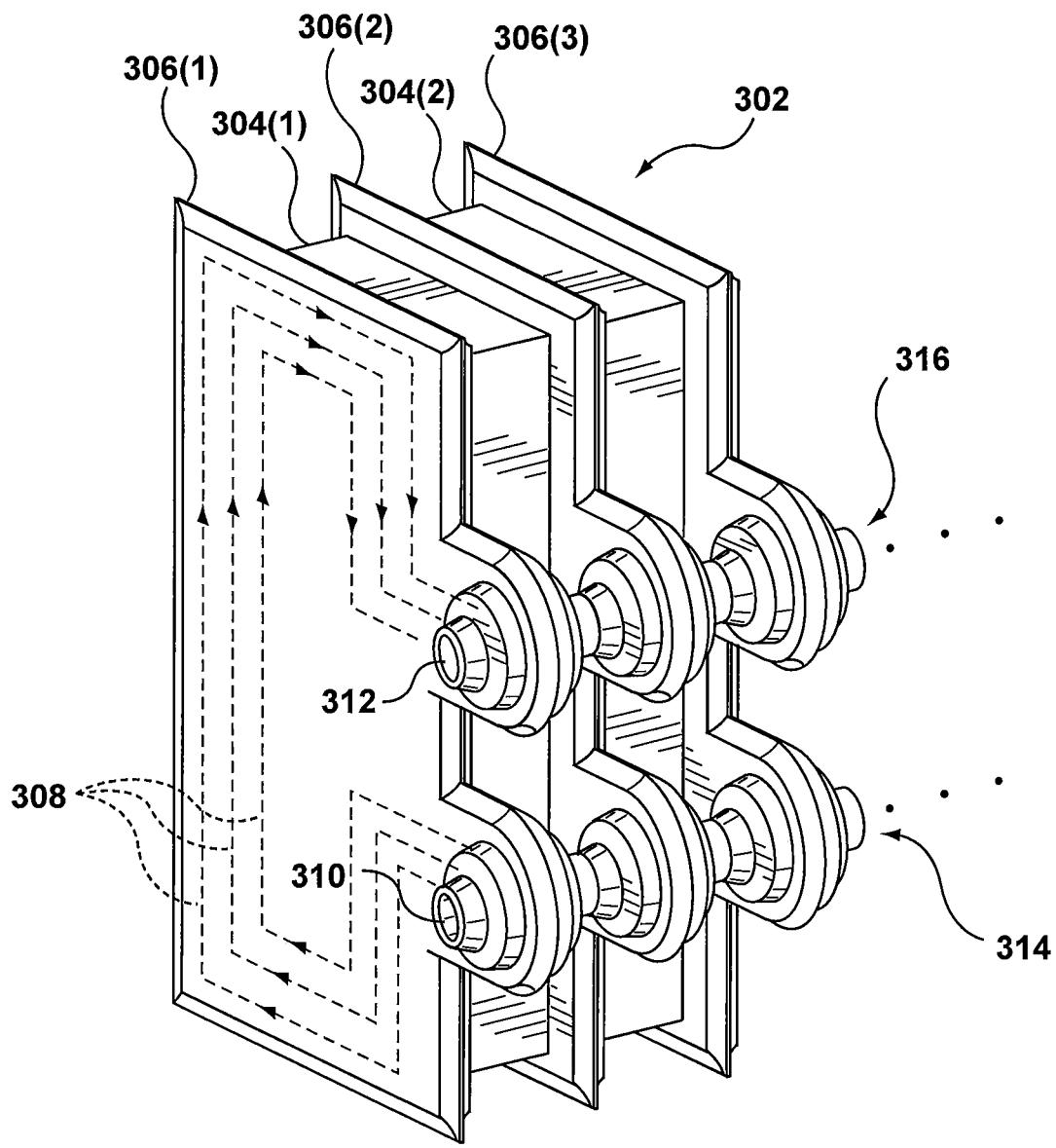
FIG. 25 is a perspective view of part of the heat exchanger of FIG. 22.

FIG. 25 schematically illustrates three heat exchanger plates 306(1), 306(2) and 306(3) of heat exchanger 302 and FIG. 24 schematically illustrates a battery module 304 which could for example be located between heat exchanger plates 306(1) and 306(2) or between heat exchanger plates 306(2) and 306(3). In the illustrated embodiments, the heat exchanger plates 306 and the battery modules 304 have a rectangular footprint or profile; however they could have other shapes in other example embodiments such as square or circular. Each battery module 304 houses at least one battery cell which may for example be a prismatic lithium-ion battery cell (however other rechargeable battery cells could be used). In the illustrated embodiment, each battery module 304 includes a rectangular substantially rigid case or frame housing the one or more battery cells.

Figure 23:
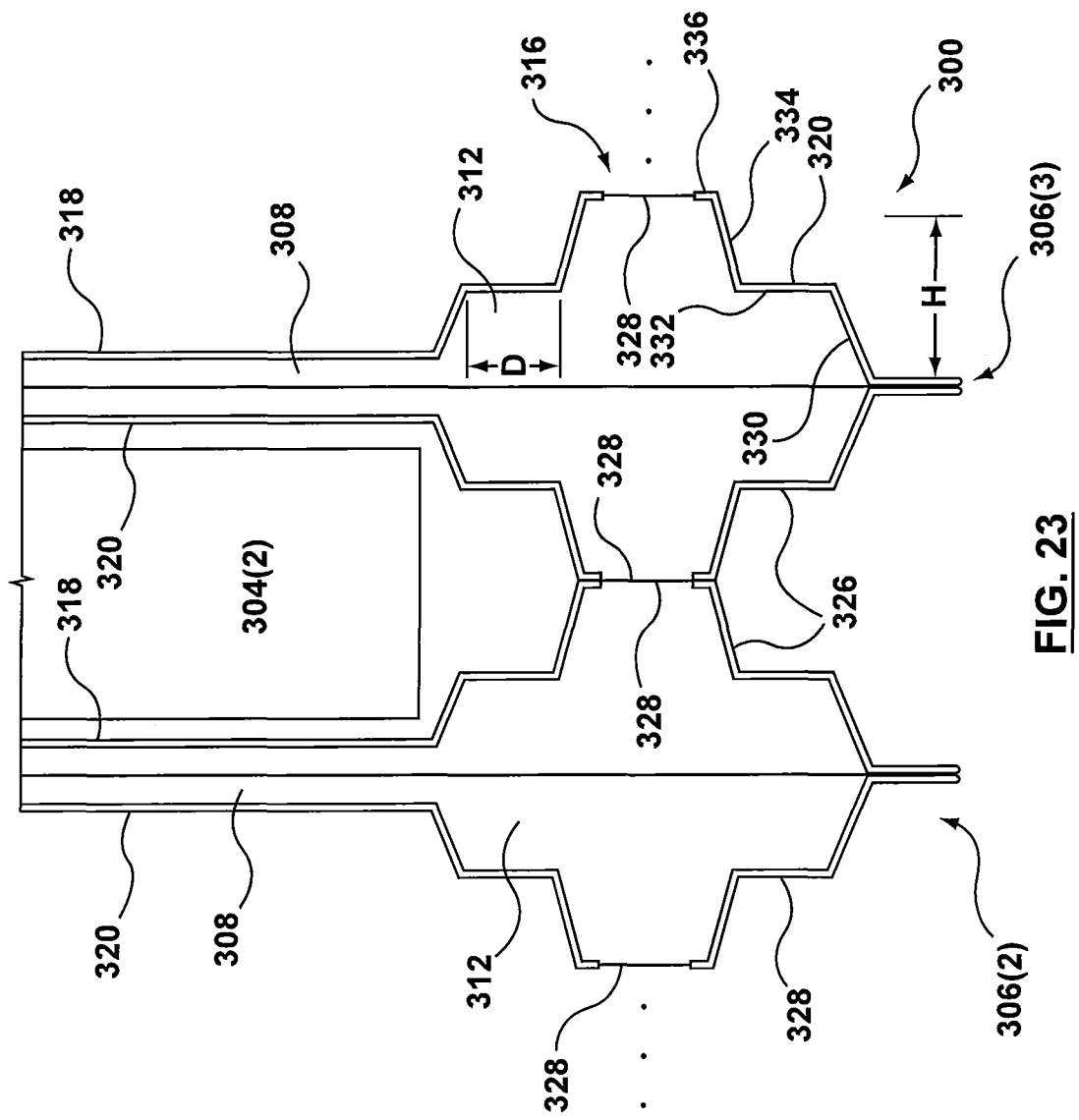
FIG. 23 is an enlarged sectional view taken along the lines A-A of FIG. 22.

As seen in FIGS. 23 and 25, in an example embodiment, the heat exchanger plates 306 each define multiple internal fluid flow paths or passages 308 (shown in dashed lines in FIG. 25) between a fluid inlet 310 and a fluid outlet 312. In the illustrated embodiment, each plate 306 include several substantially parallel C-shaped internal flow passages 308, however many different fluid flow path configurations are possible including for example a single serpentine flow path between the inlet 310 and outlet 312. In an example embodiment, the fluid inlet 310 of all the plates 306 are connected to a common fluid inlet manifold 314, and the fluid outlets 312 are all connected to a common fluid outlet manifold 316. In operation a heat exchange fluid is distributed to each of the heat exchanger plates 306 via inlet manifold 314 and collected from the heat exchanger plates 306 via outlet manifold 316. In some example embodiments, the fluid passing through the internal flow passages 308 is used to cool the heat exchanger plates 306 and the battery modules 304 located therebetween, although in some example embodiments the fluid passing through the internal flow passages 308 is used to heat the heat exchanger plates 306 and the battery modules 304 during at least some parts of battery operation.

Figure 22:
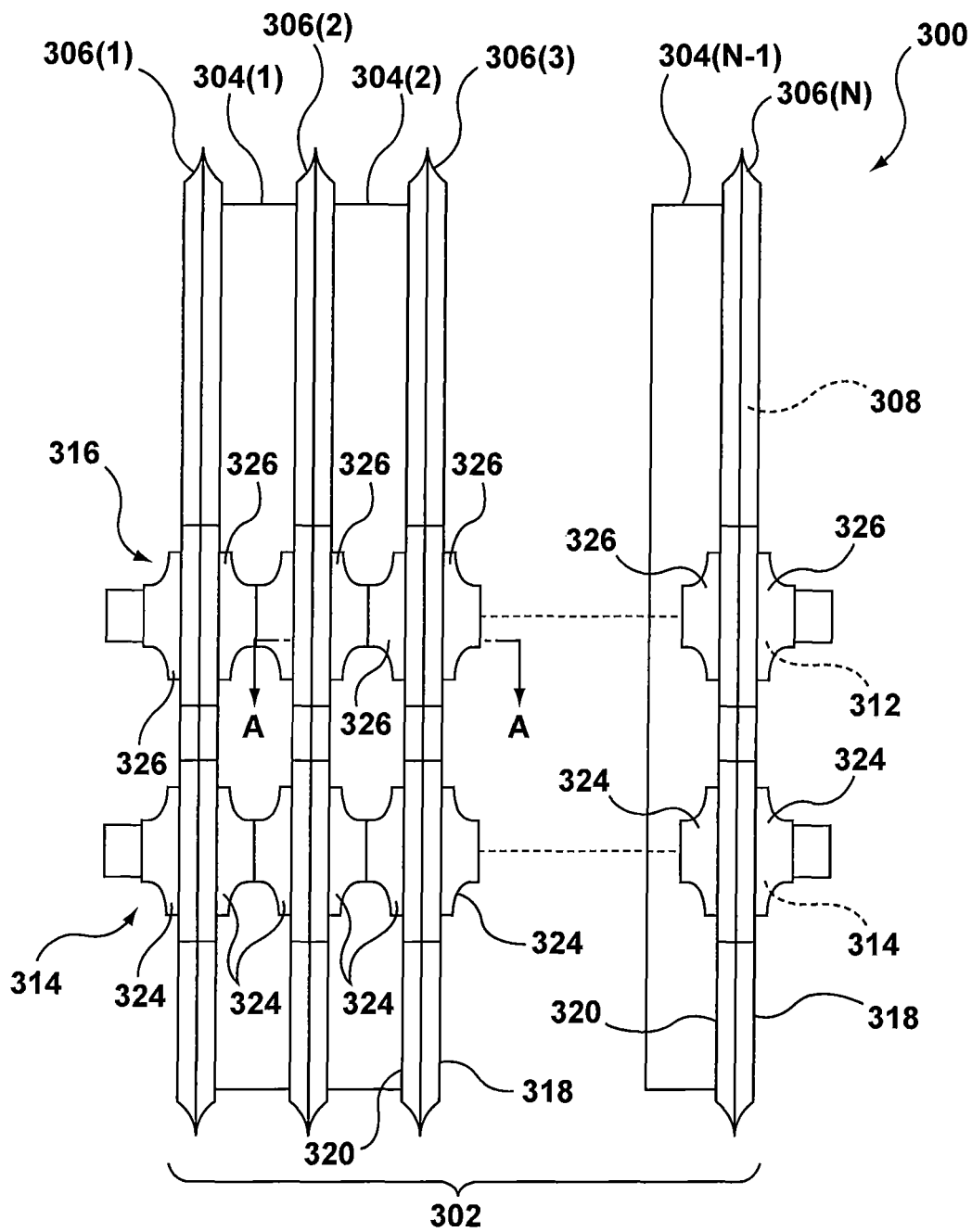
FIG. 22 is an end view of a battery unit according to a further example embodiment.

In an example embodiment, each heat exchanger plate 306 is formed from a pair of mating, substantially identical first and second plate members 318, 320 as best seen in FIGS. 22 and 23. In the illustrated embodiment first plate member 318 and second plate member 320 are each substantially planar members having outer facing grooves 322 that cooperate to define internal fluid flow passages 308. Furthermore, the plate members 318, 320 each include a pair of outwardly extending bubbles or bosses 324 and 326 that each define a respective flow opening 328. The bosses 324 of the first and second plate members 318, 320 of each heat exchanger plate 306 are aligned to form the plate inlet 310, and the bosses 324 of all the plates 306 are aligned in fluid communication with each other to form inlet fluid manifold 314 of the heat exchanger 302. Similarly, the bosses 326 of the first and second plate members 318, 320 or each heat exchanger plate 306 are aligned to form the plate outlet 310, and the bosses 326 of all the plates 306 are aligned in fluid communication with each other to form the outlet fluid manifold 316 for the heat exchanger 302.

In example embodiments, the first and second plate members 318, 320 are formed from braze clad aluminum alloy or stainless steel or other metal sheet material, however plastic or other synthetic materials could be used in some embodiments. Bosses 324, 326 may for example be formed by deep drawing portions of the metal sheet material. In some example embodiments, the area a sheet material where bosses 324, 326 are to be formed may be formed with thicker material in order to provide material for deep drawing of the bosses. For example, a tailor made patch could be applied in the area of the bosses before forming the plates.

In some example embodiments, the heat exchanger 302 is pre-assembled as a unit, brazed together, and then the battery modules 304 inserted between the heat exchanger plates 306. In the illustrated embodiment, the inlet and outlet manifolds 314, 316 are both located on the same side of the heat exchanger 302 to facilitate lateral insertion of the battery modules 304 from the opposite side of the heat exchanger 302.

According to example embodiments, the bosses 324, 326 are compliant so that they can be axially compressed after the battery modules 304 are inserted to achieve thermal contact between the battery modules 304 and the heat exchanger plates 306. Such a configuration may in some applications permits a pre-compression spacing that facilitates insertion of the battery modules 304 during assembly while providing tight thermal contact between the heat exchanger plates 306 and the battery modules 304 post-compression. Additionally, in some configurations the compliant nature of the bosses 324, 326 may allow the manifolds 314, 316 of the heat exchanger 302 to effectively expand and contract during battery operation in response to expansion and contraction forces applied by the battery modules 304 as they heat up and cool down, facilitating good thermal contact between the heat exchanger plates 308 and the battery modules 304 across a range of operating temperatures.

Thus, referring to FIG. 23, the bubble or boss height "H" of a boss 326 has a pre-assembly height before the battery modules 304 are inserted of H=X, and a post assembly height of H=Y, where Y<X; during assembly, after the battery modules 305 have been inserted, the heat exchanger 302 is compressed to collapse the boss heights down to H=Y. In the embodiment of FIG. 23, each annular boss is formed from an axially extending first annular wall 330 that terminates at a radially extending first annular shoulder 332, which in turn terminates at a second axially extending second annular wall 334, which in turn terminates at a radially extending second annular shoulder 336 that defines opening 328. The shoulder 332 forms a cantilever member that provides compliancy in the boss 326 such that the elastic nature of the boss 326 is largely a function of the width or diameter D of the first annular shoulder and the thickness and resiliency of the material forming the boss 326. In one example embodiment, the boss 326 has substantially linear force deflection curve as displaced between H-X and H=Y. Inlet boss 324 is substantially identical to outlet boss 326.

In another example embodiment, the boss 326 is configured to provide a "snap through" effect whereby it is biased to H=X for a certain range of axial compression, then biased to H<=Y once the degree of axial compression passes a threshold. In this regard, FIG. 26 illustrates at (A) a boss 324, 326 biased in a pre-assembly position (before insertion of battery modules) where H=X, and at (B) the same boss 324, 326 biased in a "pack" or post-assembly position (after insertion of battery modules 304 into the heat exchanger 302) where H<=Y<X. In boss 324, 326, once the angle of deflection of the shoulder 332 passes a threshold, the boss "snaps through" to its post assembly position. In some examples, once the threshold deflection is reached the bosses of the opposed plates 306 bias the plates towards an inter-plate separation that is less than battery module height such that the plates 306 effectively clamp the opposite surfaces of battery module 304 to retain thermal contact with the battery module through a range of normal operating temperatures for the battery unit 300. As illustrated in FIG. 26 at (C) in some embodiments, the compliance of bosses 324, 326 is dependent on the shoulder dimension L and the thickness of the material used to form the plates.

As shown in FIG. 26 at (D), in some example embodiments a bellows like structure 325 can be formed on the bosses 324, 326 of either or both core plates in order to provide the bosses 324, 326 with a degree of resilient compressibility. Again, the amount of compliance is dependent on dimension L and the thickness of the material used to form the plates.

Accordingly, the compressible bosses 324, 326 of the heat exchanger 302 provide localized compliance in the region of the heat exchanger manifolds.

According to another example embodiment, a further battery unit 400 and heat exchanger 402 configuration will now be explained with reference to FIGS. 27-31. The battery unit 400 and heat exchanger 402 of FIGS. 27-31 is similar in construction and function to the battery unit 300 and heat exchanger 302 of FIGS. 22-26 except for differences that will be apparent from the Figures and the present description. In particular, as will be explained in greater detail below, rather than use compressible manifold bosses to achieve localized compliancy, the heat exchanger 402 relies on flexible manifold panels to facilitate substantially parallel compression of the heat exchanger after insertion of the battery modules 304 in order to provide good thermal contact between the heat exchanger plates and the battery modules.

The battery heat exchanger 402 includes a stack of multiple (N) substantially identical spaced apart heat exchanger modules or plates 406(1) to 406(N) (generically referred herein using reference number 406) that are substantially aligned parallel to each other in a row or column. The battery unit 400 includes battery modules 304(1) to 304(N-1) (generically referred to using reference number 304) that are interleaved with the heat exchanger plates 406 such that at least one battery module 304 is located between and in thermal contact with the opposing surfaces of two adjacent heat exchanger plates 406.

Figure 27:
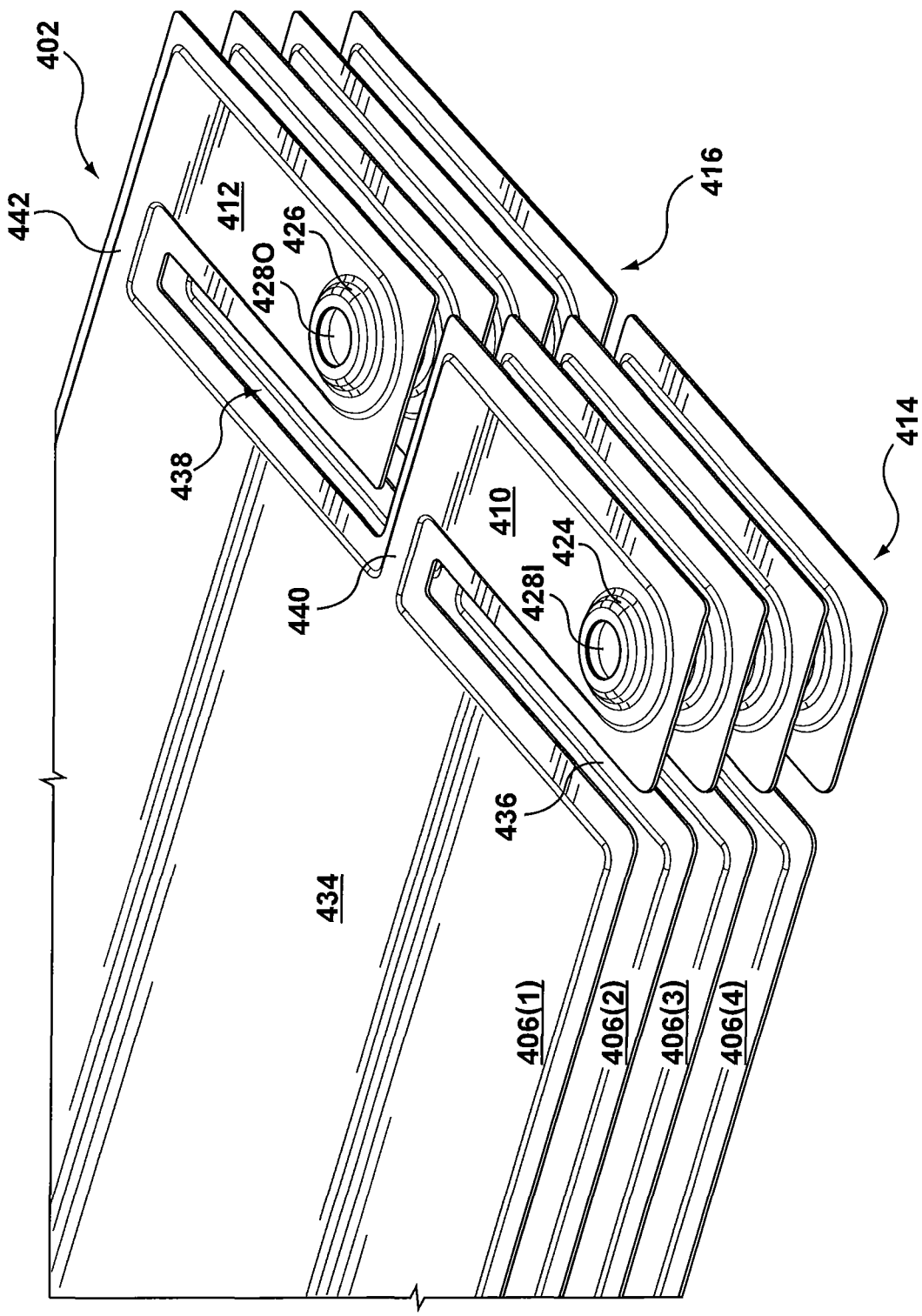
FIG. 27 is a partial perspective view of a further example embodiment of a heat exchanger.
Figure 30:
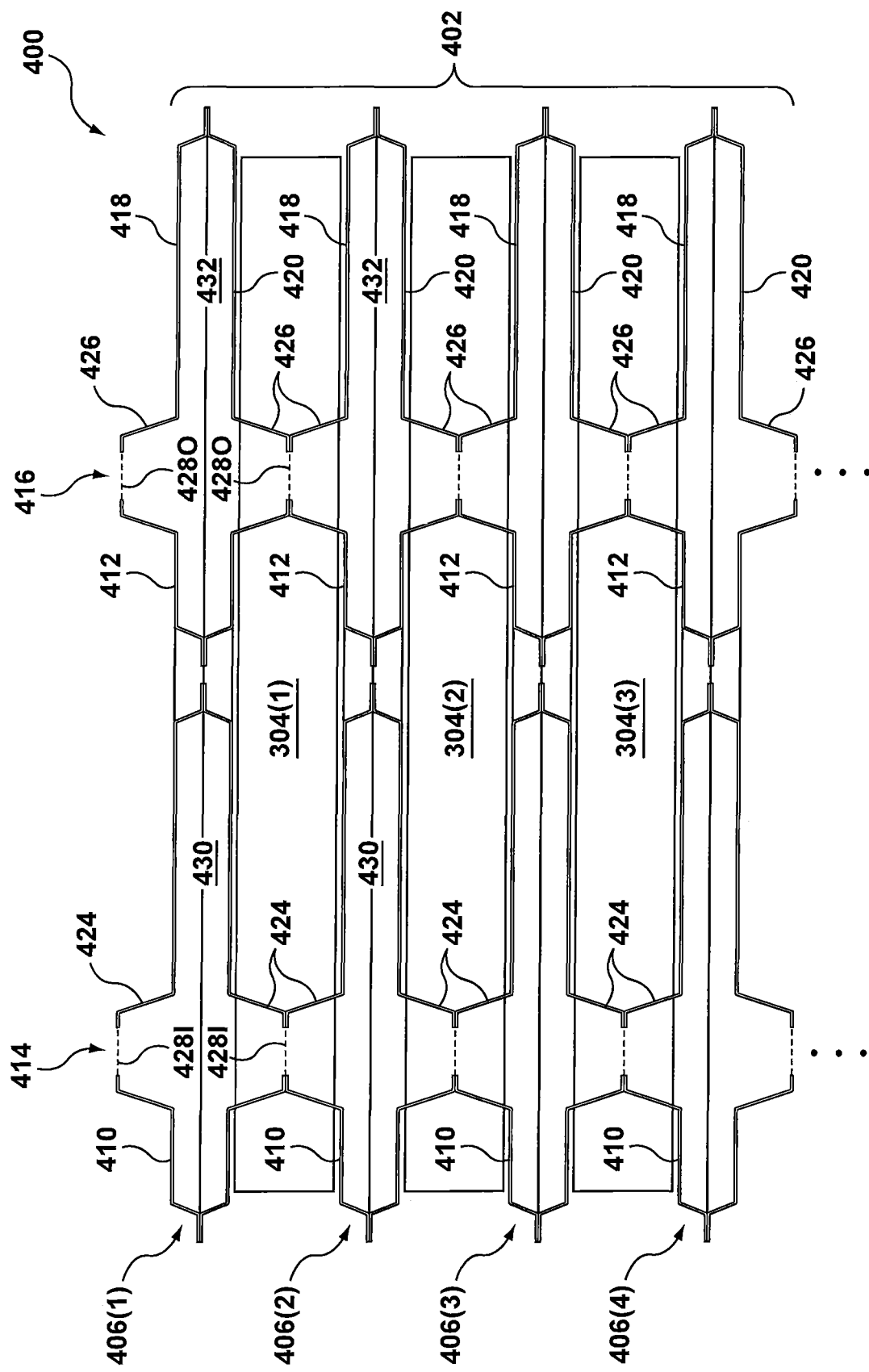
FIG. 30 is a sectional view of the battery unit of FIG. 29, taken along the lines XXX-XXX of FIG. 29.
Figure 31:
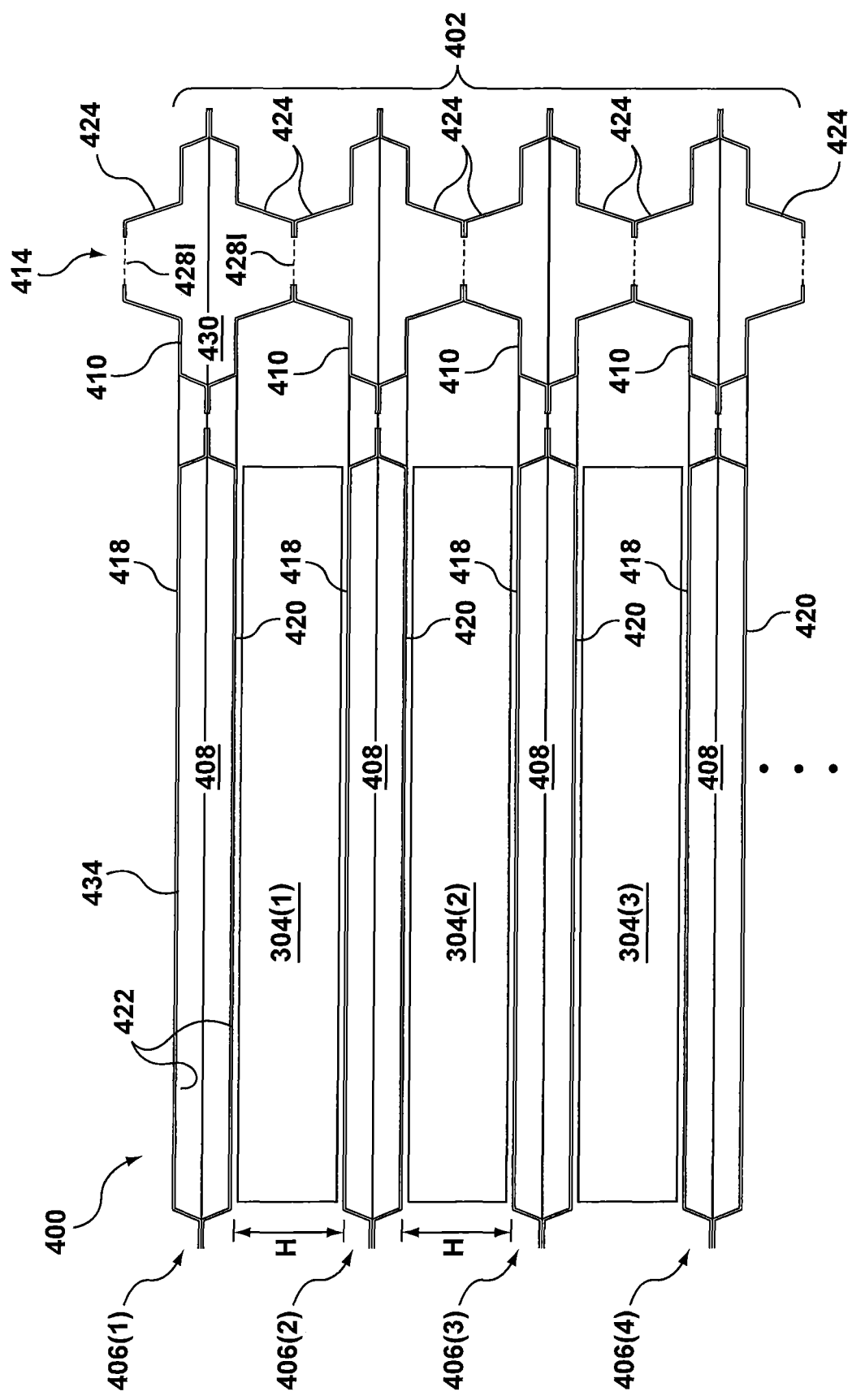
FIG. 31 is a further sectional view of the battery unit of FIG. 30, taken along the lines XXXI-XXXI of FIG. 29.

FIGS. 27, 30 and 31 schematically illustrate four heat exchanger plates 406(1)-406(4) of heat exchanger 402. In the illustrated embodiments, the heat exchanger plates 406 and the battery modules 304 have a rectangular footprint or profile; however they could have other shapes in other example embodiments such as square or circular. As with battery unit 300, each battery module 304 in battery unit 400 houses at least one battery cell which may for example be a prismatic lithium-ion battery cell (however other rechargeable battery cells could be used). In the illustrated embodiment, each battery module 304 includes a rectangular substantially rigid case or frame housing the one or more battery cells.

Figure 29:
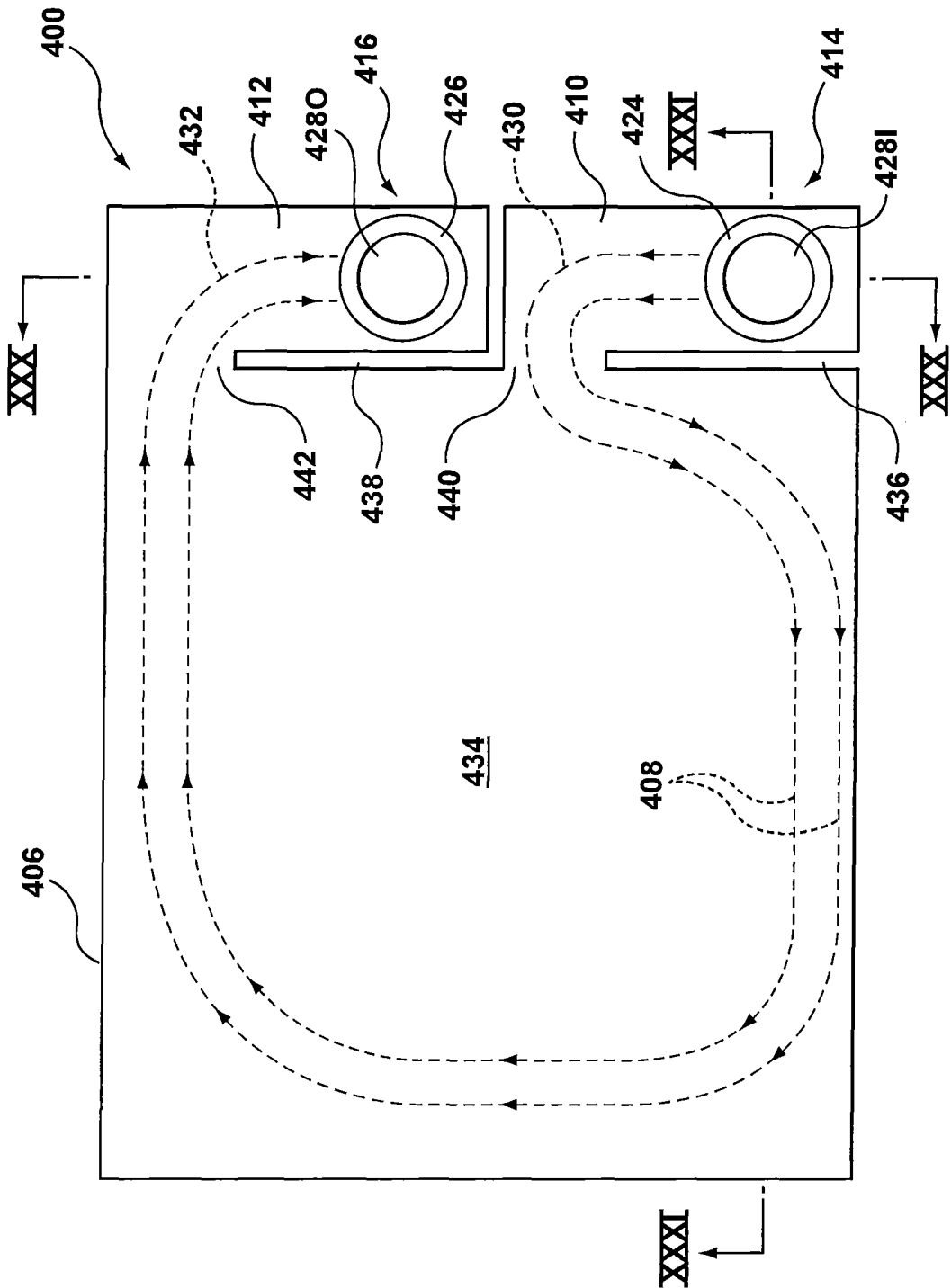
FIG. 29 is a top plan view of a battery unit that includes the heat exchanger of FIG. 27.

As seen in FIGS. 29 to 31, in an example embodiment, the heat exchanger plates 406 each include a main plate section 434 that defines one or more internal fluid flow paths or passages 408 (shown in dashed lines in FIG. 29) between a fluid inlet region or panel 410 and a fluid outlet region or panel 412. By way of example each main plate section 434 may include several substantially parallel C-shaped internal flow passages 408, however many different fluid flow path configurations are possible including for example a single serpentine flow path through the main plate section 434 between the inlet panel 410 and outlet panel 412. As best seen in FIGS. 29 and 30, the inlet panel 410 defines an internal inlet fluid passage 430 that is in fluid communication with the main plate internal passage 408, and the outlet panel 412 defines an internal outlet fluid passage 432 that is also in fluid communication with the main plate internal passage 408. The inlet panel 410 includes a pair of aligned inlet openings 428I in fluid communication with the inlet fluid passage 430 and the outlet panel similarly includes a pair of aligned outlet openings 428O in fluid communication with the outlet fluid passage 432. In the illustrated embodiments, the inlet and outlet panels 410, 412 are generally rectangular in shape, however they could have different shapes in different embodiments.

Figure 28:
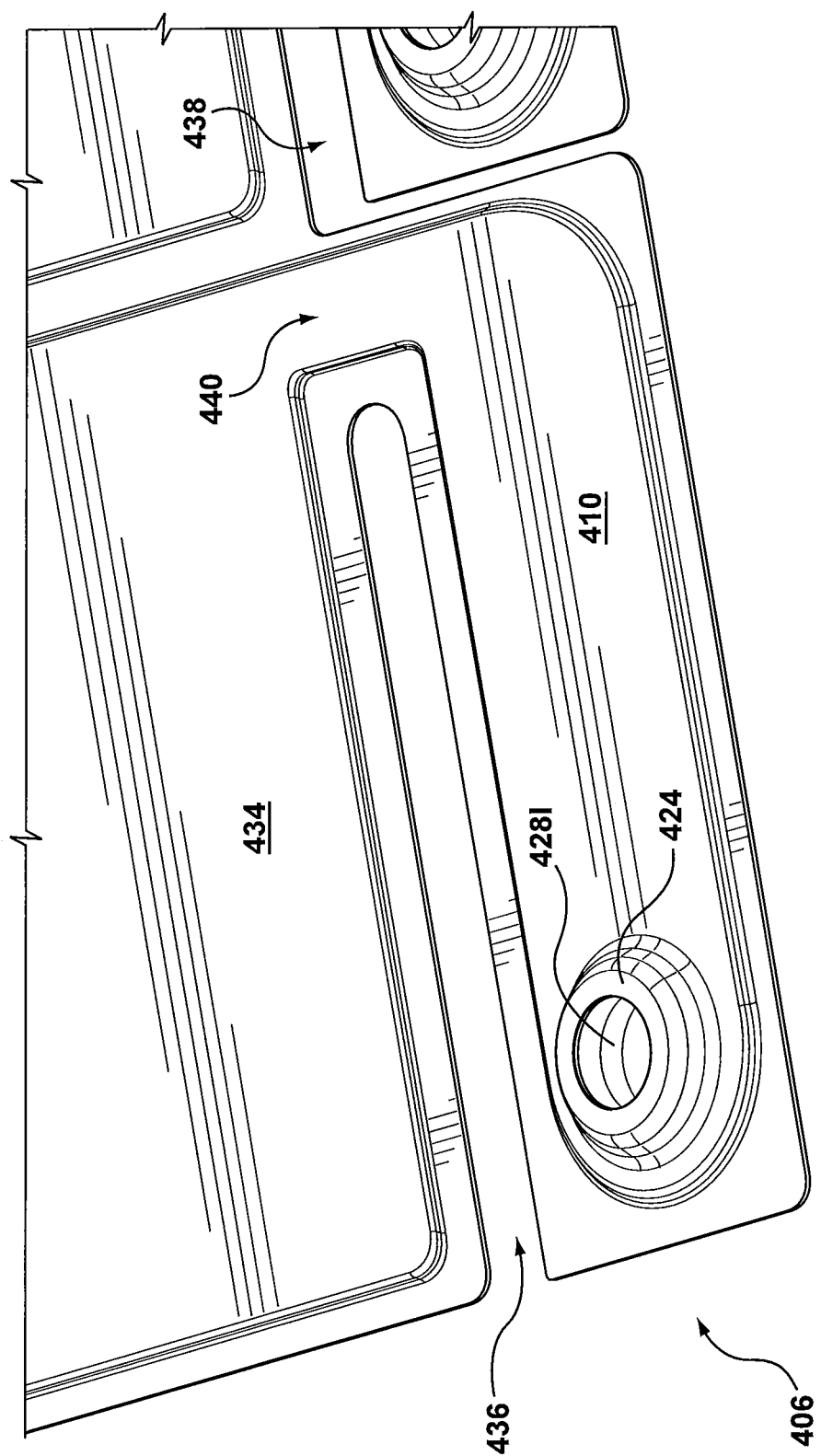
FIG. 28 is a partial perspective view of a plate of the heat exchanger of FIG. 27.

As can be seen in FIGS. 27, 28 and 29, the inlet panel 410 extends substantially parallel to and spaced apart from an end of the main plate section 434, but is attached by a joining portion 440 to the main plate member such that a gap 436 partially separates the inlet panel 410 from the main plate section 434. The joining portion 440 defines an internal fluid passage between inlet panel passage 430 and the main plate internal passage 408. Similarly, the outlet panel 412 extends substantially parallel to and spaced apart from the same end of the main plate section 434, but is attached by a joining portion 442 to the main plate section 434 such that a gap 438 partially separates the outlet panel 412 from the main plate section 434. The gap 438 also extends to separate the inlet panel 410 from the outlet panel 412. The joining portion 442 defines an internal fluid passage between the main plate internal passage 408 and the outlet panel passage 412.

In example embodiments, although the heat exchanger plate 406 has a generally rigid structure, the joining portions 440 and 442 allow the inlet panel 410 and outlet panel 412, respectively, to flex independently of each other relative to the main plate section 434.

In an example embodiment, the fluid inlet panels 410 of all the plates 406 are connected in a stack with inlet openings 428I in axial alignment to form a common fluid inlet manifold 414, and the fluid outlet panels 412 are all connected in a stack with outlet openings 428O in axial alignment to form a common fluid outlet manifold 416. In operation a heat exchange fluid is distributed to each of the heat exchanger plates 406 via inlet manifold 414 and collected from the heat exchanger plates 406 via outlet manifold 416. In some example embodiments, the fluid passing through the internal flow passages 408 is used to cool the heat exchanger plates 406 and the battery modules 304 located therebetween, although in some example embodiments the fluid passing through the internal flow passages 408 is used to heat the heat exchanger plates 406 and the battery modules 304 during at least some parts of battery operation.

In an example embodiment, each heat exchanger plate 406 is formed from a pair of mating, substantially identical first and second plate members 418, 420 as best seen in FIGS. 30 and 31, first plate and second plate members being mirror images of each other. In the illustrated embodiment first plate member 418 and second plate member 420 are each substantially planar members having outer facing grooves 422 that cooperate to define internal fluid flow passages 408. The plate members 418, 420 each include an outwardly extending bubble or boss 424 on the portion thereof that forms the inlet panel 410 and an outwardly extending bubble or boss 426 on the portion thereof that forms the outlet panel 412, with the inlet panel boss 424 defining inlet opening 428I and the outlet panel boss 426 defining outlet opening 428O. The inlet panel bosses 424 of the first and second plate members 418, 420 of each heat exchanger plate 406 are aligned, and the inlet panel bosses 424 of all the plates 406 are aligned in fluid communication with each other to form inlet fluid manifold 414 of the heat exchanger 402. Similarly, the outlet panel bosses 426 of the first and second plate members 418, 420 of each heat exchanger plate 406 are aligned, and outlet panel bosses 426 of all the plates 406 are aligned in fluid communication with each other to form the outlet fluid manifold 416 for the heat exchanger 402.

In example embodiments, the first and second plate members 418, 420 are formed from braze clad aluminum alloy or stainless steel or other metal sheet material, however plastic or other synthetic materials could be used in some embodiments.

In some example embodiments, the heat exchanger 402 is pre-assembled as a unit as shown in FIG. 27 and brazed together. Subsequently, the battery modules 304 inserted between the heat exchanger plates 406 to form a completed battery unit 402. In the illustrated embodiment, the inlet and outlet manifolds 414, 416 are both located on the same side of the heat exchanger 402 to facilitate lateral insertion of the battery modules 304 from the opposite side of the heat exchanger 402.

As noted above, the presence of gaps 436 and 438 between the inlet and outlet panels 410 and 412, respectively, permit the panels 410, 412 of each heat exchanger plate 406 to flex relative to main battery plate section 43, and vice versa. Once the heat exchanger 402 is preassembled (before battery modules 304 are inserted), the inlet panels 410 are rigidly connected in a stack with bosses 424 aligned to form the inlet manifold 414, and the outlet panels 412 are rigidly connected in a stack with bosses 426 aligned to form the outlet manifold 416. The flexible connection between each of the panels 410, 412 and their respective main heat exchanger section 434 permits the main heat exchanger sections 434 to have a pre-compression spacing that facilitates insertion of the battery modules 304 and a post compression spacing that provides a good thermal contact between the plates and the battery modules 304. For example, as shown in FIG. 31, the heat exchanger 402 has post-compression inter-plate separation of H—in some example embodiments, during battery module 304 insertion the main plate sections 434 are separated from each other a distance greater then H, after which the plate sections 434 are compressed in a substantially parallel manner to separation distance H to achieve thermal contact between the battery modules 304 and the heat exchanger plates 406. Such a configuration may in some applications facilitate insertion of the battery modules 304 during assembly while provided tight thermal contact between the heat exchanger plates 406 and the battery modules 304 post-assembly. In example embodiments, post compression the heat exchanger is biased to have an inter-plate separation of H or less than H so that the battery modules 304 are effectively clamped between pairs of opposed heat exchanger plates 406.

Accordingly, the heat exchanger 402 makes use of local compliance in the region of the heat exchanger manifolds to facilitate thermal contact with inserted battery modules 304.

Figure 32A:
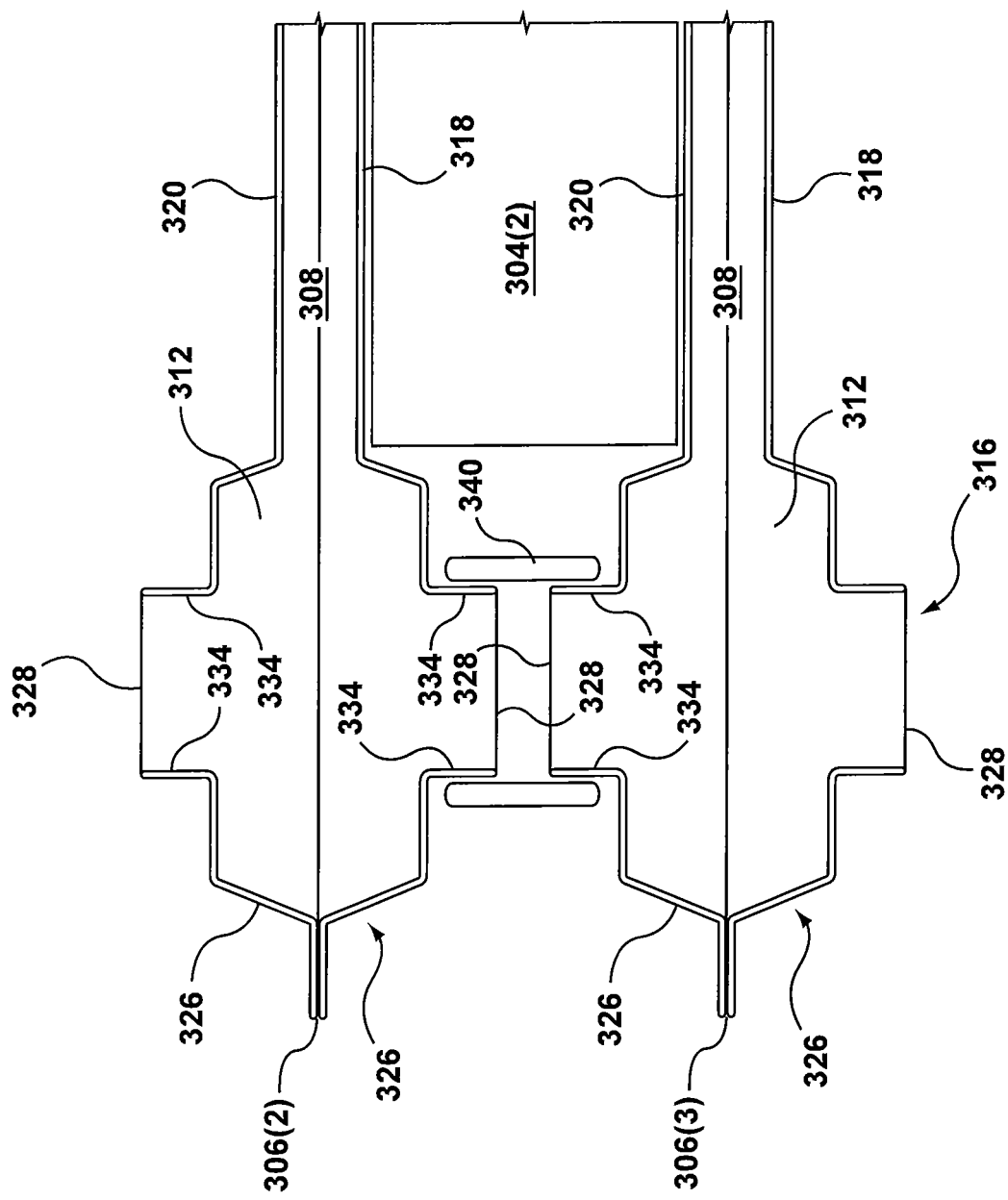
FIGS. 32A and 32B are each enlarged partial sectional views (taken from a similar view as FIG. 23) that illustrate further example embodiment of a heat exchanger that includes manifold connectors between compliant boss regions of adjacent heat exchanger plates.
Figure 32B:
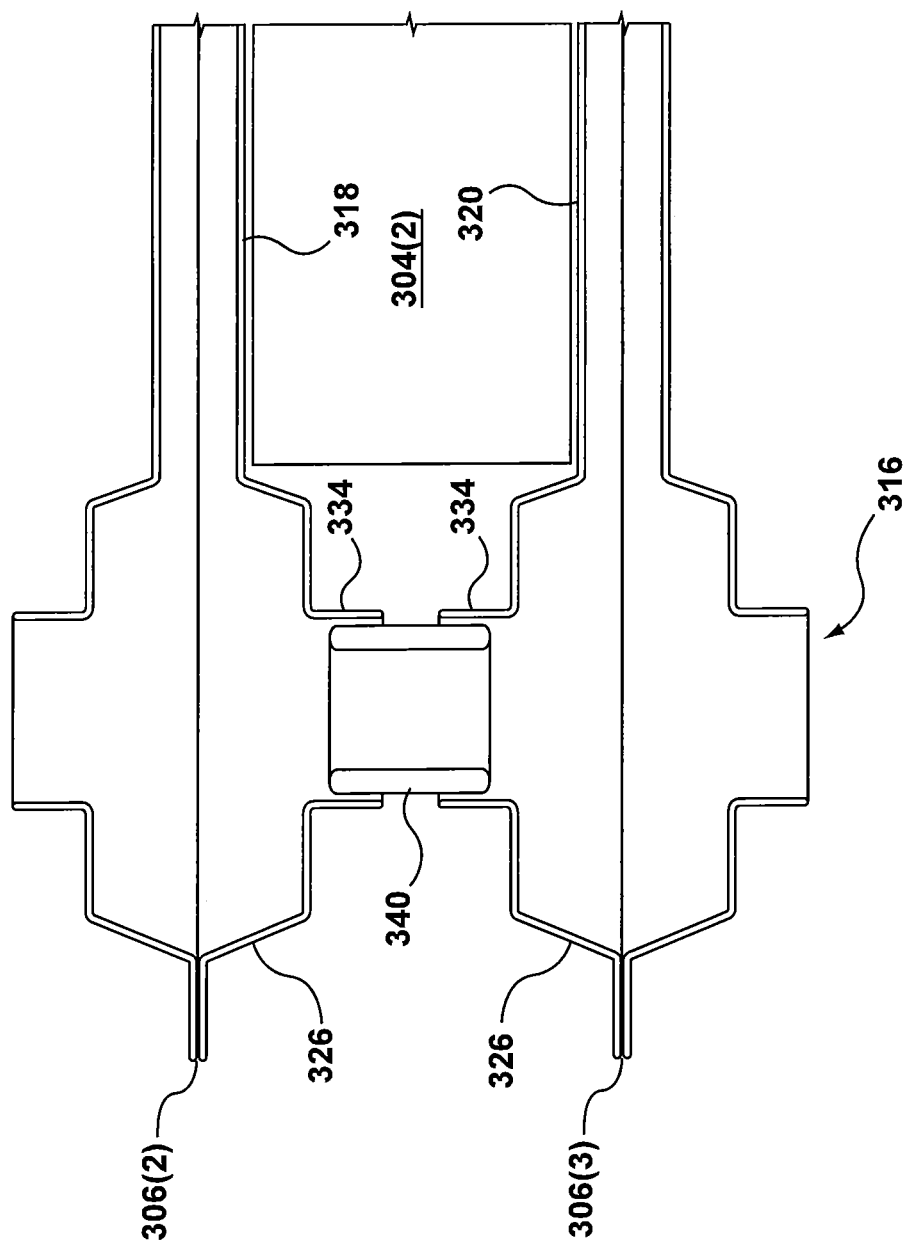

In some example embodiments, intermediate tubular connectors (examples of which are described in greater detail below in the context of FIGS. 32A, 32B) other than or in addition to bosses 424, 426 may be employed to interconnect inlet panel and outlet panel sections 410, 412.

As shown in the embodiment of FIGS. 27 and 29 of heat exchanger 400, the flexible panels 410 and 412 are located at the same end of the heat exchanger 400 with joining portion 440 located near a midpoint at the common end and joining portion 442 located near a side edge. The manifold 416 connecting the panels 412 is spaced apart from the joining portion 442 and located near the midpoint at the end of the heat exchanger 400, and the manifold 414 connecting the panels 410 is spaced apart from joining portion 440 and located near the opposite side edge (e.g. the opposite side that the joining portion 442 is located at). Such a configuration, in which one of the inlet/outlet openings 428I/428O (and resulting manifold) is near a midpoint at one end of the heat exchanger 402 and the other of the inlet/outlet openings 428I/428O (and resulting manifold) is at the corner near the same end of the heat exchanger 402, can in some applications facilitate parallel compression of the heat exchanger plates 406 to facilitate post-assembly thermal contact between the heat exchanger plates and the battery modules. However, in some example embodiments the panels 410, 412 could have different relative locations, and in this regard FIGS. 29A, 29B and 29C each illustrate different possible locations of inlet and outlet panels 410, 412 relative to the main heat exchanger plate sections 434 in heat exchanger embodiments 402-1, 402-2, and 402-3, respectively. The heat exchangers 402-1, 402-2 and 402-3 are substantially identical in construction and operation to heat exchanger 402, with the only substantial difference being in the location of the flexible panels relative to the main heat exchanger section in the heat exchanger plates.

Referring again to the compliant boss heat exchanger 302 of FIGS. 22-26, in at least some example embodiments an intermediate manifold connector is used between adjacent heat exchanger plates 306. In this regard, FIGS. 32A and 32B are each enlarged partial sectional views (taken from a similar view as FIG. 23) that illustrate further example embodiments of a heat exchanger that includes manifold connectors between compliant boss regions of adjacent heat exchanger plates 306. The heat exchangers of FIGS. 32A and 32B are substantially identical to the heat exchanger 302 of FIGS. 22-26 except for differences that will be apparent from the Figures and the present description. As shown in FIG. 32A, rather than having direct contact between the bosses 326 of adjacent heat exchanger plates 306 (shown as 306(2) and 306(3) in FIG. 32A), the opposing bosses 326 of adjacent plates 306(2) and 306(3) are spaced apart from each other and interconnected by an intermediate cylindrical connector 340 that forms part of the manifold 316. In the embodiment of FIG. 32A, the annular wall section 334 of the boss 326 of each opposing plate member 318 and 320 of adjacent heat exchanger plates 306(2), 306(3) is internally received within and connected to an inner surface of the cylindrical connector 340. The inlet bosses 324 are similarly connected by intermediate cylindrical connectors 340. In the embodiment of FIG. 32A, the bosses 324 and 326 are deformably compliant as described above in respect of the embodiments of FIGS. 22-26 to allow interleaving of and post assembly thermal contact with battery modules 304. The embodiment of FIG. 32B is similar to that of FIG. 32A, except that the cylindrical connector 340 is inserted into (rather than over) the opposed annular walls 334 of adjacent bosses 326.

In example embodiments, the annular walls 334 and cylindrical connector 340 are connected by brazing and may include a mechanical interlock such as a swaging or staking mechanical connection to facilitate pre-brazing assembly and strengthen the post-brazing connection. In some example embodiments, the use of an intermediate connector 340 facilitates separate pre-assembly and testing of each of the heat exchanger plates 306, followed by pre-assembly of the heat exchanger as a complete unit that is then ready for final assembly by the interleaving of battery modules 304 within the heat exchanger structure. The intermediate connector 340 could also be used with flexible panel heat exchangers 402, 402-1, 402-2 and 402-3 of FIGS. 27-31.

Figure 33:
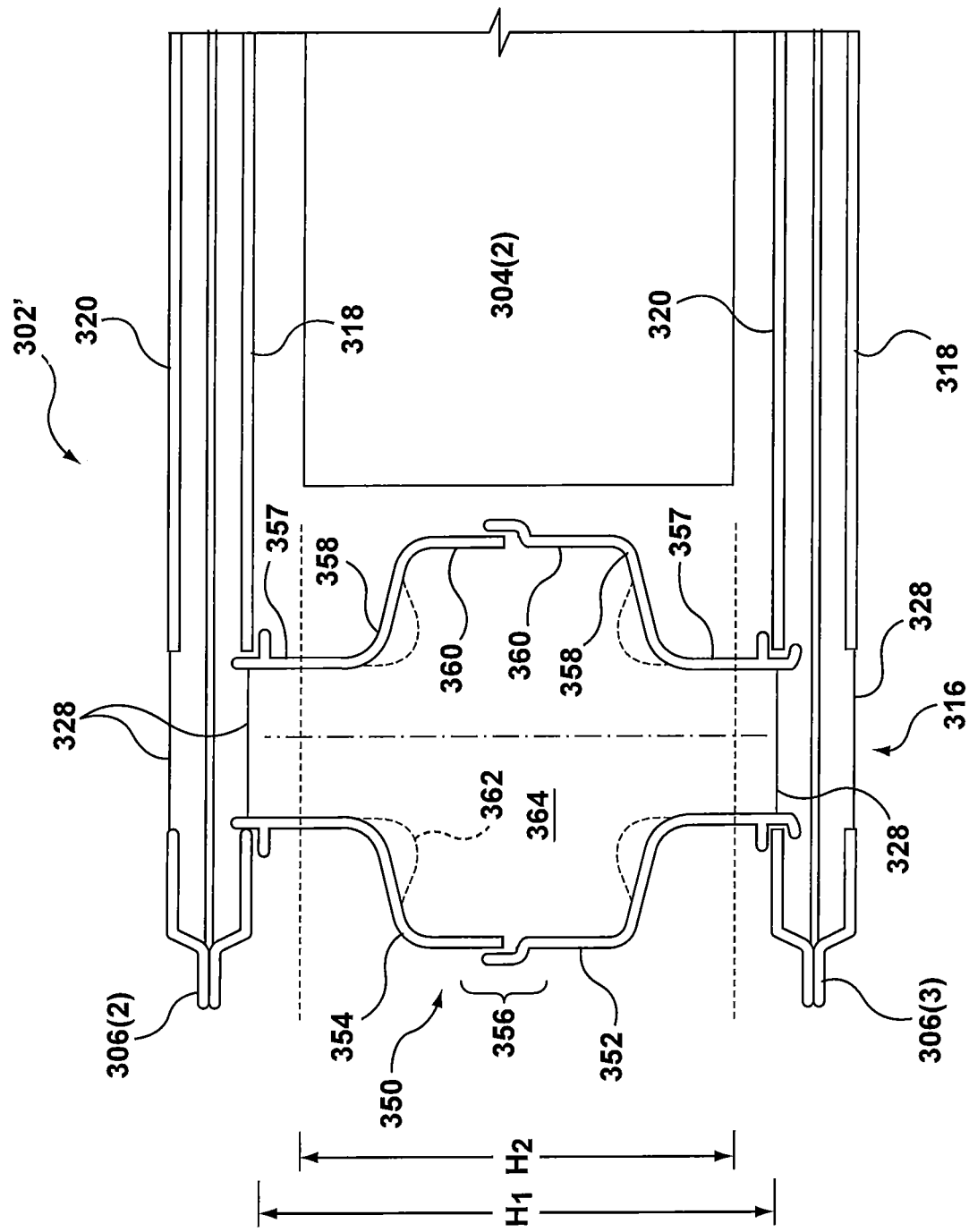
FIG. 33 is an enlarged partial sectional view (taken from a similar view as FIG. 23) that illustrate further example embodiment of a heat exchanger that includes a two-piece compliant manifold connector between adjacent heat exchanger plates.
Figure 34:
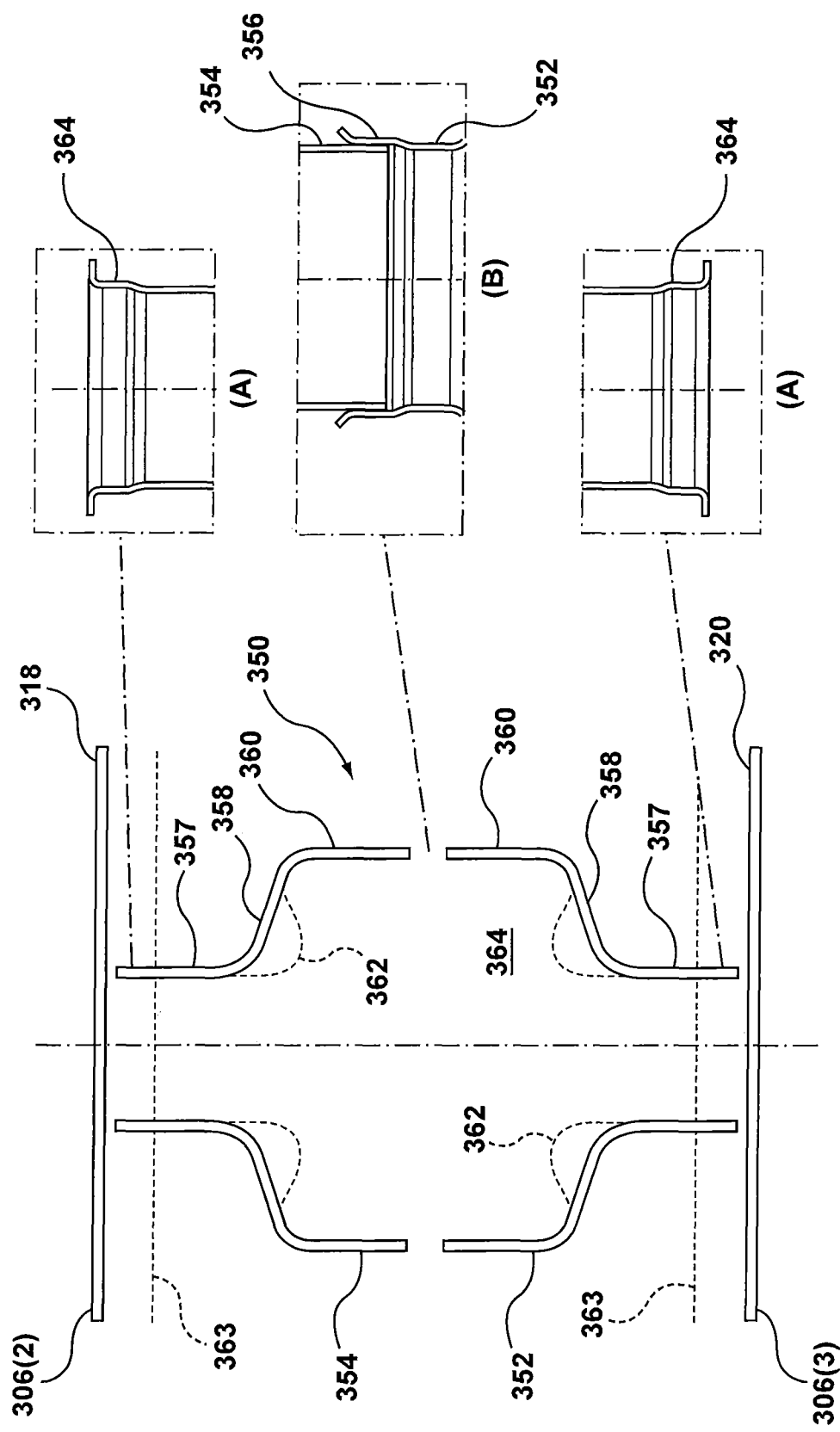
FIG. 34 is a schematic sectional view that further illustrates a compliant manifold connector of the heat exchanger of FIG. 33.
Figure 35:
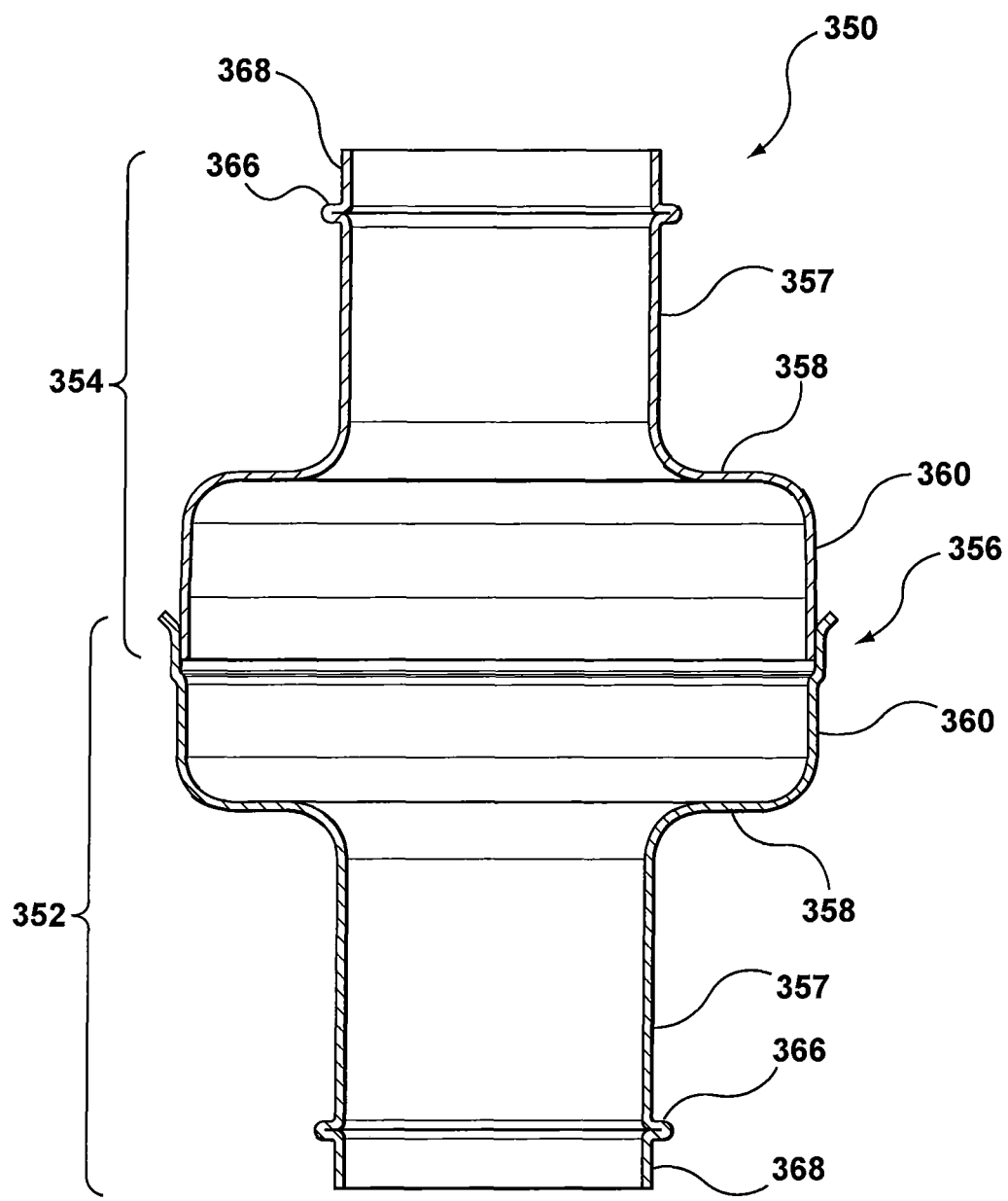
FIG. 35 is a front view of the compliant manifold connector of FIG. 34.

FIGS. 33-35 illustrate yet a further compliant heat exchanger 302' for use in battery unit 300 according to another example embodiment. The heat exchanger 302' is similar in construction and operation to the heat exchanger 302 of FIGS. 22-26 and the heat exchangers of FIGS. 32A and 32B with the exception of differences that will be apparent from the Figures and the present description. Similar to the heat exchangers of FIGS. 32A and 32B, the heat exchanger 302' of FIGS. 33-35 makes use of an intermediate manifold connector 350 for interconnecting adjacent heat exchanger plates 306. However, the heat exchanger 302' differs from the heat exchanger 302 of FIGS. 22-26 and the heat exchangers of FIGS. 32A and 32B in that inter-heat exchanger plate compliancy is achieved by having a two-piece compressible intermediate manifold connector 350 rather than by building compliancy into the bosses on the plate members 320, 318. In this regard, as shown in FIG. 33, in at least some embodiments the plate members 318 and 320 of heat exchanger 302' do not include raised boss regions around the flow openings 328 (or flow openings 326). Although the figures illustrate a manifold connector 350 as applied to the outlet manifold 316, the inlet manifold 314 of heat exchanger 302' is constructed in a similar manner.

An example of a two-piece compressible intermediate manifold connector 350 will now be described with reference to FIGS. 33-35. Terms used herein that denote absolute orientation such as upper and lower, right and left are used for the purpose of description only with reference to the orientation of the Figures and not to limit the configurations described herein to any absolute physical orientation. In an example embodiment, each intermediate manifold connector 350 defines an internal heat exchanger fluid flow passage 364 for transporting a heat exchanger fluid to or from heat exchanger plates 306, and includes first and second resilient, compressible manifold fixtures 352 and 354. As shown in FIGS. 33 and 35, in an example embodiment, the first fixture 352 includes an axially extending lower or first annular wall 357 that has a lower end connected within the outlet opening 328 of the upper plate member 320 of heat exchanger plate 306(3). The first fixture 352 also includes an axially extending upper or second annular wall 360 that mates with the lower end of the second fixture 354 at a joint 356. The second annular wall 360 has a larger diameter than the first annular wall 357 and the lower end of the second annular wall 360 and the upper end of the first annular wall 357 are joined by an integral, generally radially extending annular shoulder 358.

Similarly, the second fixture 354 includes an axially extending upper or first annular wall 357 that has an upper end connected within the outlet opening 328 of the lower plate member 318 of heat exchanger plate 306(2). The second fixture 354 also includes an axially extending lower or second annular wall 360 that mates with the upper end of the first fixture 352 at a joint 356. The second annular wall 360 has a larger diameter than the first annular wall 357 and the lower end of the second annular wall 360 and the upper end of the first annular wall 357 are joined by an integral, generally radially extending annular shoulder 358.

In an example embodiment, the first and second fixtures 352, 354 are each formed from single piece of metal material (for example aluminum, aluminum allow or stainless steel) that is deep drawn to provide the shape shown in the Figures. In one example embodiment, the metal is thinner in the shoulders 358 of the first and second fixtures 352, 354 than the first annular wall 357, providing each of the first and second fixtures 352, 354 with a degree of resilient crushability or compressibility as illustrated by dashed lines 362 and 363 in FIGS. 33 and 34, with dashed lines 362 representing a post-compression location of the shoulders 358 and lines 363 representing a post-compression location of the heat exchanger plates 306(2) and 306(3).

In one example embodiment, each heat exchanger plate 306 is pre-assembled with a pair of first fixtures 352 connected to its upper plate member 320 (one at outlet opening 328 and one at inlet opening 326), and a pair of second fixtures 354 connected to its lower plate member 318 (one at outlet opening 328 and one at inlet opening 326). Each pre-assembled heat exchanger plate 306 is brazed, and the brazed plate 306 then be tested for leaks if desired. The heat exchanger plates 306(1)-306(N) are then assembled in a stack to form a completed preassembled heat exchanger 302', and the joints 356 between mating fixtures 352, 354 are brazed. The preassembled heat exchanger 302' has an inter-plate separation distance of H1 as shown in FIG. 33, allowing battery modules 304 (which have a height less than H1) to be interleaved between the heat exchanger plates 306. After the battery modules 304 are inserted, the heat exchanger 302' is compressed to height H2 as shown in FIG. 33 such that the battery modules 304 are in thermal contact on opposite sides with the heat exchanger plates 306 they are each sandwiched between.

As explained above in respect of FIG. 26, in at least some example embodiments the first and second fittings 352, 354 are configured to behave with a snap-through effect such that through an initial range of deflection the fittings 352, 354 are biased towards the position shown in solid lines in FIGS. 33 and 34 (which corresponds to inter-plate separation H1), but after a threshold level of deflection the fittings 352, 354 then become biased towards the position indicated by dashed lines 362 (which corresponds to inter-plate separation H2). In some examples, once the threshold deflection is reached the fittings 352, 354 bias opposed plates 306 to an inter-plate separation that is less than the actual post assembly separation distance H2 such that the plates 306 effectively clamp the opposite surfaces of battery module 304 to retain thermal contact with the battery module through a range of normal operating temperatures for the battery unit 300.

FIG. 34 illustrates at (B) an example of a possible mechanical joint that can be applied between the first and second fittings 352, 354 at joint 356, and at (A) possible mechanical joints between the first second fittings 352, 354 and the respective plates 306. As shown at (B) in one example, the lower end of the second fitting 354 is received within the upper end of the first fitting 352, forming an overlap joint. As shown at (A), in some examples, an axial flange 364 may be provided around opening 328 to provide an overlap joint between the plate and the first or second fitting 352, 354. As shown in FIG. 35, in some example embodiments, a rib 366 may be formed on the first annular wall 357 of fittings 352, 354 to mate with the plate 306 about opening 328, and in some example the end 368 of a fitting 352, 354 that is inserted into the opening may be expanded or swaged or staked to provide a mechanical joint with the plate pre-brazing.

Figure 36C:
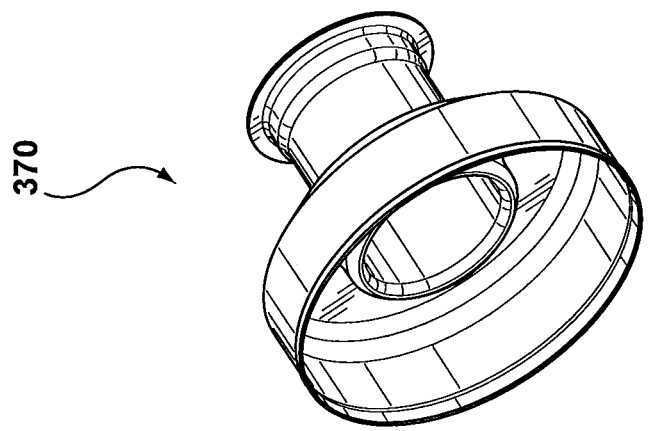
FIGS. 36A, 36B and 36C are views of a further embodiment of a two-piece compliant manifold connector that can be applied to the heat exchanger of FIG. 33, with FIG. 36A being a top view, FIG. 36B being a sectional view taken along lines A-A of FIG. 36A and FIG. 36C being a perspective view.
Figure 36B:
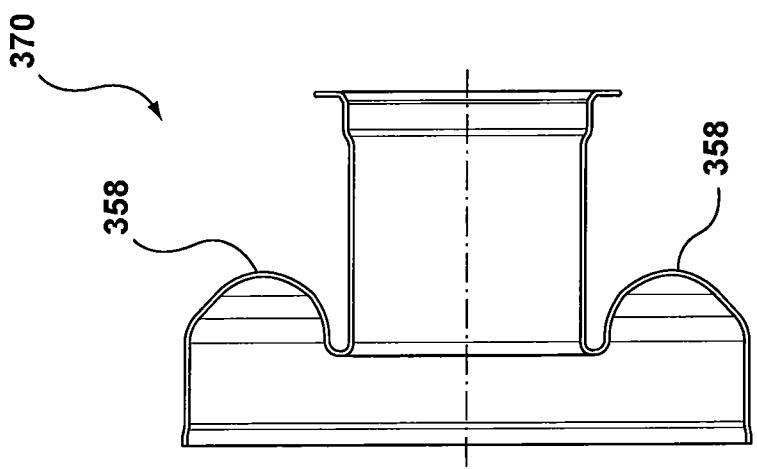
Figure 36A:
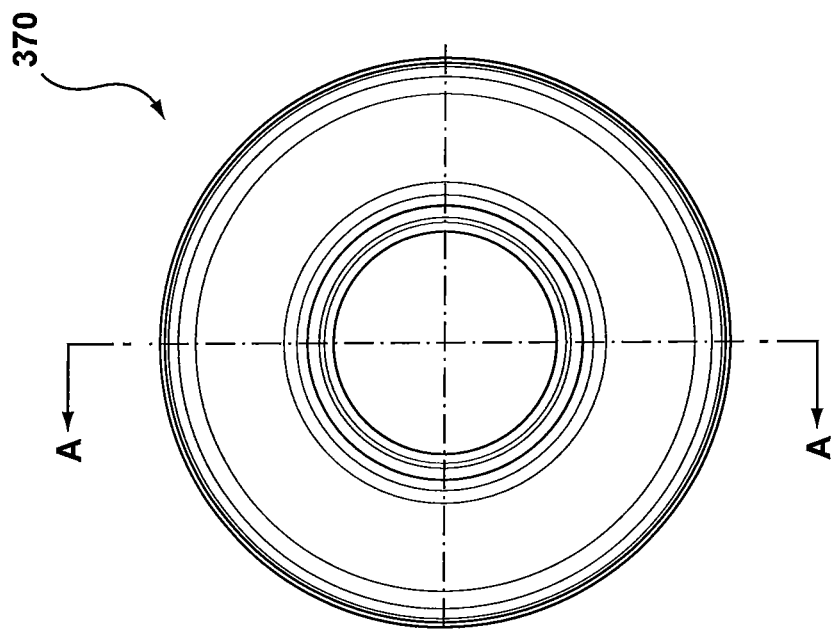

FIGS. 36A, 36B and 36C are views of a further embodiment of a fitting of a two-piece compliant manifold connector that can be applied to the heat exchanger of FIG. 33, with FIG. 36A being a top view, FIG. 36B being a sectional view taken along lines A-A of FIG. 36A and FIG. 36C being a perspective view. The fitting 370 is substantially identical to first and second fittings 352, 354, with the exception that the radially extending shoulder 358 of the fitting 370 has an arcuate profile that provides a weakened region at the transition between the annular walls of the fitting 370 that can in some embodiments reduce the compressive force required to move the fitting 370 to its compressed or crushed position.

Figure 37:
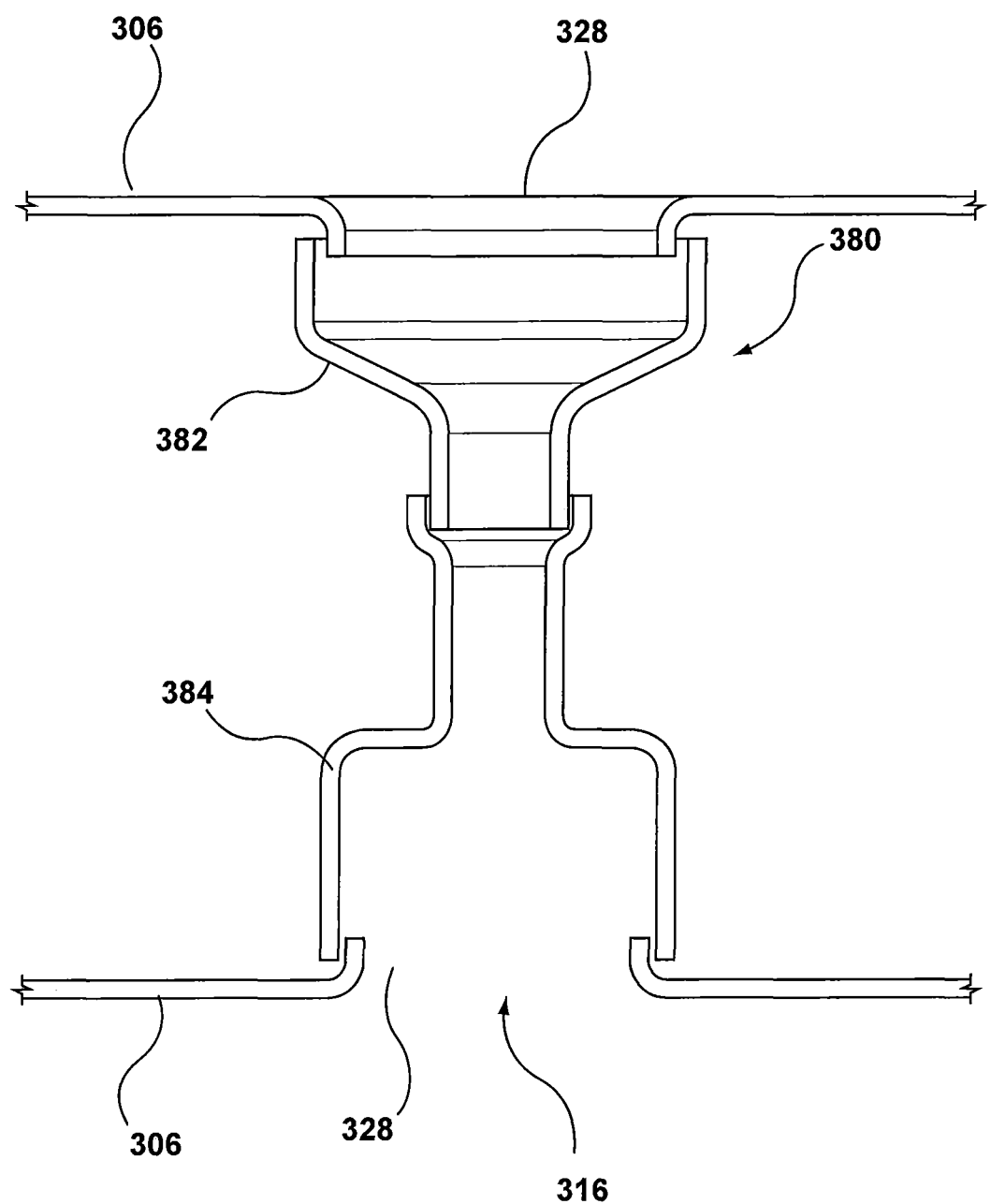
FIG. 37 is a sectional view of a yet a further embodiment of a two-piece compliant manifold connector that can be applied to the heat exchanger of FIG. 33.

FIG. 37 is a sectional view of yet a further embodiment of a two-piece compliant manifold connector 380 that can be applied to the heat exchanger of FIG. 33. The manifold connector 380 includes two fittings 382 and 384 and is similar to connector 350 except that the fittings 382 and 385 are each reversed such that the larger diameter region of each fitting is joined to a respective plate 306, and the smaller diameter regions of the fittings are connected together, providing the connector 380 with an hourglass type figure as opposed to the bulging middle of connector 350.

Although the heat exchanger manifolds 314, 316, 414, 416 have been described above as either dedicated inlet or outlet manifolds with parallel heat exchanger fluid flow occurring in the same direction through all heat exchanger plates 306, 406, it will be appreciated that flow circuiting could be used to route the heat exchanger fluid through manifolds 314, 316, 414, 416 in a variety of different path configurations by including flow barriers along the respective lengths of one or both of the manifolds.

Accordingly, in the embodiments of FIG. 22-37, the battery units are formed from battery modules that are interleaved with heat exchanger plates. In at least some examples, the battery modules are inserted into a pre-assembled heat exchanger, with the spacing between the heat exchanger plates being dimensioned to accommodate battery modules within acceptable tolerance ranges. After insertion of the battery modules, a compression action or step on the heat exchanger ensures good contact between the heat exchanger plates and the battery modules. In at least some example embodiments, the compressible manifold configuration of the embodiments of FIGS. 22-26 and 32A-37 and the flexible inlet/outlet plate configuration of FIGS. 27-31 provide compliance to absorb the compressive forces in a substantially parallel movement of the plate pairs with rather limited angular movement of the plates in order to reduce the risk of buckling.

A common feature of the embodiments of FIGS. 1-37 is the provision of good thermal contact between battery modules and the heat exchanger modules after assembly, with the thermal contact being facilitated by resilient compliance of regions of the respective heat exchanger structures. In at least some example embodiments, compliant regions of the heat exchangers of FIGS. 1-37 are at least temporarily displaced as portions of the heat exchangers are positioned between battery modules.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

What is claimed is:

1. A heat exchanger for use with at least two battery modules, each of the battery modules comprising at least one battery cell housed within a rigid container, the heat exchanger comprising:
   a plurality of planar heat exchanger plates that each include:
      a main plate section defining an internal fluid passage,
      an inlet panel connecting an inlet to the main plate section, and
      an outlet panel connecting an outlet to the main plate section,
      wherein the inlet panel and the outlet panel are joined to the main plate section, each of the inlet panel and the outlet panel joined to the main plate section via a joining bridge, and a gap separating each of the inlet panel and the outlet panel from the main plate section such that the main plate section can be displaced relative to each of the inlet panel and the outlet panel via the respective joining bridge,
   the inlet panel and the outlet panel of at least some of the heat exchanger plates being joined to the inlet panel and the outlet panel of adjacent heat exchanger plates to form a stack of spaced apart, substantially parallel, heat exchanger plates, the main plate sections of the stacked heat exchanger plates being compressed together to engage battery modules inserted therebetween.

2. The heat exchanger of claim 1, wherein the main plate sections are compressible towards each other to provide thermal contact with battery modules inserted between the heat exchanger plates.

3. The heat exchanger of claim 2, wherein the inlet panel and the outlet panel are located at a common side of the heat exchanger stack defining a battery module insertion side of the heat exchanger that is opposite to the common side of the inlet panel and the outlet panel.

4. The heat exchanger of claim 2, wherein the inlet panel and the outlet panel are located at opposite sides of the heat exchanger stack.

5. The heat exchanger of claim 2, wherein each heat exchanger plate comprises a first plate and a second plate secured together and defining the fluid flow passage therebetween.

6. The heat exchanger of claim 5, wherein the first plate and the second plate are formed from metal material and brazed together.

* * * * *